United States Patent
Kakinada et al.

(10) Patent No.: US 10,966,107 B2
(45) Date of Patent: Mar. 30, 2021

(54) METHODS AND APPARATUS FOR CONFIGURING AND/OR MANAGING COMMUNICATIONS DEVICES

(71) Applicant: Charter Communications Operating, LLC, St. Louis, MO (US)

(72) Inventors: Umamaheswar A. Kakinada, Centennial, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/438,379

(22) Filed: Jun. 11, 2019

(65) Prior Publication Data

US 2020/0396623 A1    Dec. 17, 2020

(51) Int. Cl.
*H04L 12/24* (2006.01)
*H04W 24/04* (2009.01)
*H04W 52/34* (2009.01)
*H04W 16/14* (2009.01)

(52) U.S. Cl.
CPC ........ *H04W 24/04* (2013.01); *H04L 41/0654* (2013.01); *H04W 16/14* (2013.01); *H04W 52/34* (2013.01)

(58) Field of Classification Search
CPC ........ H04W 4/00; H04W 4/02; H04W 84/18; H04L 1/00; H04L 12/24; H04L 41/0823; H04L 69/18; H04L 41/0806; H04L 67/34; H04L 41/0859; G05B 19/18; G05B 19/05; G05B 19/054; G05B 2219/13114; G05B 19/042; H04Q 9/00; G01J 5/34

USPC ........................................................ 370/217
See application file for complete search history.

(56) References Cited

U.S. PATENT DOCUMENTS

| | | | |
|---|---|---|---|
| 9,917,903 B2 * | 3/2018 | Clernon | H04L 41/0806 |
| 9,935,833 B2 * | 4/2018 | McAllister | H04L 41/0823 |
| 9,974,015 B2 * | 5/2018 | Zakaria | H04L 67/12 |
| 10,111,070 B2 * | 10/2018 | Zakaria | H04L 12/283 |
| 10,492,204 B2 * | 11/2019 | Kakinada | H04L 69/18 |
| 10,591,887 B2 * | 3/2020 | Stagg | G05B 19/054 |
| 10,687,377 B2 * | 6/2020 | Schwengler | H04W 88/16 |
| 2018/0338280 A1 * | 11/2018 | Zakaria | H04L 67/025 |
| 2020/0037053 A1 * | 1/2020 | Cobb | G01J 5/00 |
| 2020/0178237 A1 * | 6/2020 | Kakinada | H04W 72/0446 |
| 2020/0192320 A1 * | 6/2020 | Stagg | G05B 19/054 |

* cited by examiner

*Primary Examiner* — Man U Phan
(74) *Attorney, Agent, or Firm* — Straub & Straub; Michael P. Straub; Stephen T. Straub

(57) ABSTRACT

A communications device is equipped with a secondary interface, e.g., a wireless interface, in addition to a primary interface. In at least some, but not necessarily all, embodiments the secondary interface is an inexpensive Long Range (LoRa) wireless interface which uses sub-GHz unlicensed spectrum or a Narrow Band-Internet of Things (NB-IoT) wireless interface which uses licensed spectrum. The secondary interface is in addition to a primary interface used for transmitting data, e.g., user data such as voice, video or text data, to a primary communications device, e.g., to support voice or data applications running on a user device. The secondary interface, e.g., a low power/low data rate interface, is used for communicating small amounts of data for initial configuration, fault recovery, re-initialization, and/or updates.

18 Claims, 17 Drawing Sheets

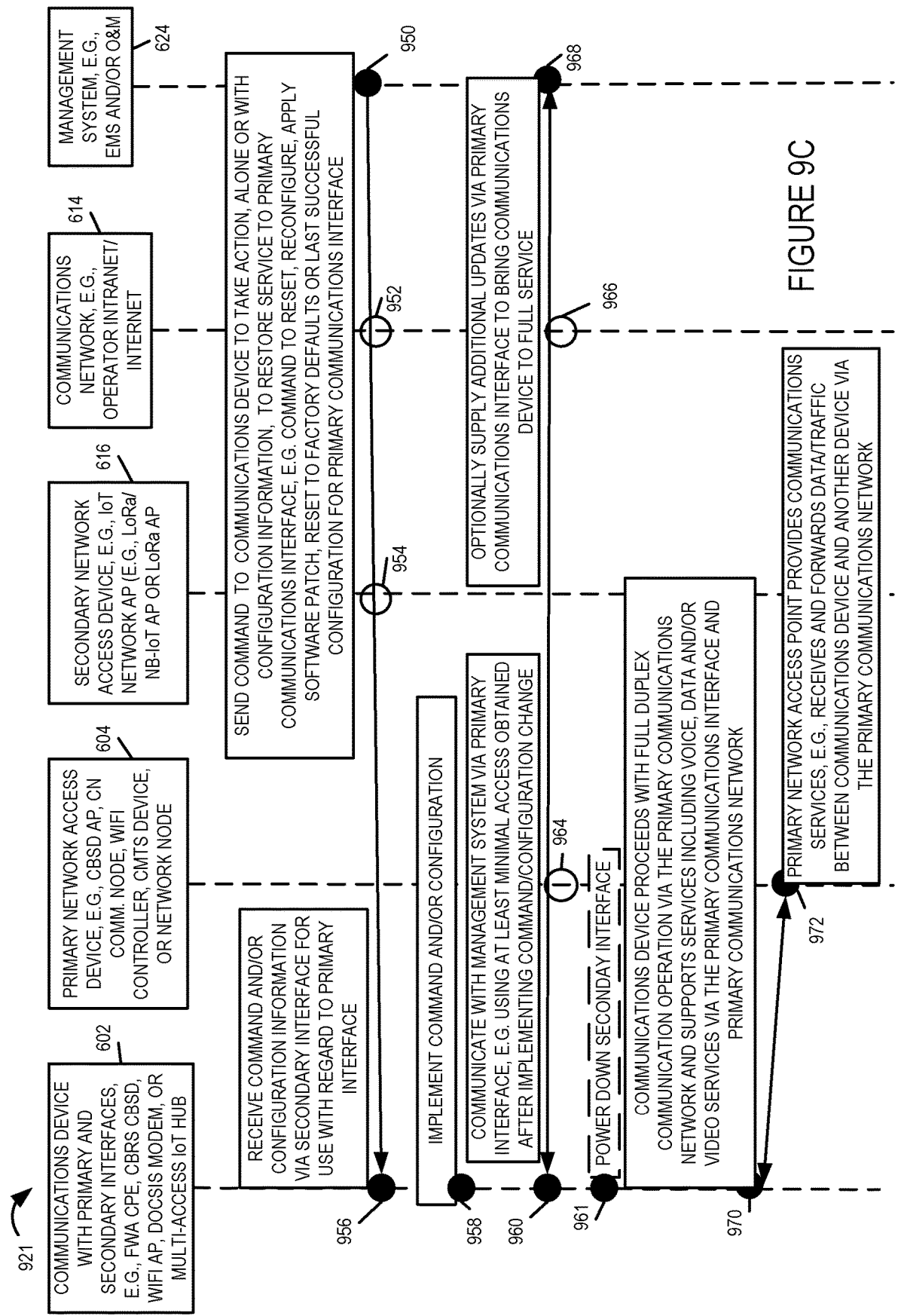

METHODS AND APPARATUS FOR CONFIGURING AND/OR MANAGING COMMUNICATIONS DEVICES

FIELD

The present invention relates to communication methods and apparatus, and more particularly, to methods and apparatus for configuring and/or managing communications devices, e.g., as part of an initial configuration of a primary communications interface and/or in response to a fault condition interfering with communication via a primary communications interface.

BACKGROUND

Many communications devices need to be configured prior to being able to communicate data over their primary communications interface. The configuration may involve such things as setting maxim transmission power levels, frequencies to be used and/or loading a device with an identifier to be used for communicating with other devices and/or setting security key or secrets used to secure communications with other devices via a particular interface, e.g., a wireless interface.

Configuration of devices is particularly important in systems where resources are shared and a management device or system is involved in the control and/or configuration of devices seeking to use some of the shared resources.

Consider, for example, CBRS which stands for Citizens Broadband Radio Service. The Federal Communications Commission established CBRS as a way for shared wireless broadband use of the 3550-3700 Mhz band, which is more commonly known as the 3.5 Ghz band. While user devices can use CBRS radio spectrum at relatively low power levels, e.g., at a Equivalent Isotropically Radiated Power (EIRP) up to 23 dBm, devices operating above this power level are considered Citizens Broadband Radio Service Devices (CBSDs) that are required to be authorized by an SAS (Spectrum Access System) to be allowed to use CBRS system resources. A CBSD is normally identified by a CBSD identifier (CBSD-ID). In a CBRS system it is the responsibility of CBSD to register and be authorized by an SAS before the CBSD may begin using CBRS radio resources for communications.

CBSDs are likely to be used for fixed wireless access (FWA) since they are likely to use high power, e.g., with an EIRP over 23 dBm. CBSDs for FWA are likely to be found in many locations, including homes, to facilitate Internet and/or other network access by UEs, e.g., in a home or office.

While it might be relatively easy to supply wired power to a FWA, it may be difficult to provide a wired network connection which can be used to contact an SAS to obtain authorization from the SAS to use CBRS resources.

Numerous other devices may have similar issues and/or needs with respect to having to contact a management system to obtain configuration information needed to use particular communications resources and/or authorization to use particular communications resources. For example there may be, and often is, a need to manage and/or configure CPE devices such as cable modems, fixed wireless access CPEs (whether or not they are CBRS based devices) and/or other communications devices which are intended to communicate primarily over a particular communications network or interface but may require configuration and/or authorization for such communication.

While initial device configuration and/or authorization with respect to a communications network or resource is one problem, another problem that exists relates to managing and/or reconfiguration devices when communication over their primary communications interface suffers a fault. For example, if a CBSD becomes unable to communicate using CBRS resources, e.g., because of a configuration issue, it would be desirable if there was a way to reconfigure and/or reauthorize the device from a remote location. Similarly, if a WiFi access point or other type of communications device suffered a failure with regard to the device's primary communications interface, e.g., a WiFi interface in the case of a WiFi access point, it would be desirable if the device could be reconfigured from a remote location without having to send a human technician to the site where the device is located.

In view of the above, it should be appreciated that there is a need for methods and/or apparatus for managing and/or configuring a communications device without requiring the communications device's primary interface to be active and without having to be at the location of the device.

SUMMARY

In various embodiments a communications device is equipped with a secondary interface, e.g., a wireless interface, in addition to a primary interface. In at least some but not necessarily all embodiments the secondary interface is a Long Range (LoRa) wireless interface which uses sub-GHz unlicensed spectrum or a Narrow Band-Internet of Things (NB-IoT) wireless interface which uses licensed spectrum. The secondary interface is in addition to a primary interface used for transmitting data, e.g., user data such as voice, video or text data, to a primary communications device, e.g., to support voice or data applications running on a user device. Thus a communications device implemented in accordance with the present invention includes a primary interface which supports data communication with a primary network and a secondary wireless interface.

The communications device can be preconfigured, e.g., by a device manufacture prior to deployment of the communications device at a customer premise or other location where it is powered on and used to communicate user data or data corresponding to multiple user devices. Because the communications device in accordance with a secondary interface includes a secondary wireless interface which is preconfigured in at least some embodiments with a secondary device identifier to be used to identify the communications device when communicating via the secondary interface, security information, e.g., encryption key or shared secret to be used to secure information communicated via the secondary interface or respond to challenges as part of an authorization and/or registration process, and/or information sufficient to enable the communications device to contact and register with a management device or system via the secondary interface, the communications device can be powered on at a customer location, contact a management device or system and receive additional configuration information that is useful or required to configure the primary communications interface.

Because the secondary interface is wireless, the communications device can be deployed, authenticated and registered without the device's primary communications interface having to operate and support initial network connectivity. In addition in the event of a fault or failure, whether it be a hardware, registration, or configuration failure with respect to the primary interface, the communications device can communicate with a management device or system, report its configuration or other information, such as a detected fault, and receive information from the management system or device that can be used to reconfigure one or more device settings or information used with regard to communications via the primary communications interface thereby, restore and/or enable communications via the primary interface.

In various embodiments the secondary interface supports a lower data rate than the primary interface. In some embodiments the secondary interface supports a longer communications range than the primary interface. In addition, in some embodiments the secondary interface can be, and sometimes is, operated using less power than an amount of power required to operate the primary interface over a fixed period of time. The secondary interface can be, and sometimes is, powered by a backup battery, e.g., when there is a wired power failure to the device. In at least some such cases the communications device does not support communications via the primary interface in the event of power failure and constrains communication on backup power to the secondary interface.

In some, but not necessarily all embodiments, the communications device restricts communication via the secondary interface to control and/or management related communications such as device status, configuration, control information and/or device authorization/registration related communications, with communication of user or application data such as voice data, text messages or video being restricted from being communicated over the secondary interface. In some embodiments the device is associated with a customer premises location and/or customer account prior to shipment to a customer but is activated and made functional after it is powered and contacts the management system via the secondary wireless interface.

In various embodiments the secondary interface is implemented at relatively low cost. While the average data rates supported by the secondary interface may be, and sometimes are, a fraction, e.g., 1/10th, 1/1000th or even 1/10,000th the data rate supported by the primary interface, the secondary wireless interface can add a significant amount of control and configuration functionality reducing the risk that a technician need be deployed to a site. This is because the status and/or configuration of the communications device can be remotely determined via the secondary interface and the primary interface can be reconfigured by altering one or more settings and/or resetting various security related information via the secondary interface even when communications via the primary interface is not possible due to a configuration or other issue.

Reconfiguration of a device via the secondary interface can be initiated by either a management device in the management system in response to detecting a communications failure or fault with respect to communication with an individual communications device via its primary interface or by the communications device which detects a communications failure or fault with respect to its primary communications interface.

Accordingly whether a communications device detects a fault with respect to communications via a device's primary interface or a network device detects a fault with respect to communications with a device via its primary interface, the secondary interface remains a reliable secondary channel which can be used to reconfigure and hopefully restore a communications device's ability to communicate via the device's primary communications interface.

The methods and apparatus of the present invention in which a communications device is equipped with a secondary communications interface, e.g. a Long Range (LoRa) wireless interface which uses sub-GHz unlicensed spectrum or a Narrow Band-Internet of Things (NB-IoT) wireless interface which uses licensed spectrum, are well suited to a wide range of applications. For example in some embodiments the communications device including both a primary communications interface and a secondary wireless interface is a FWA CPE, CBRS CBSD, Wi-Fi or Wi-Fi6 Access Point. In other embodiments the communications device is communications device which includes as a primary communications interface a Docsis Modem. In still other embodiments the communications device is a multi-access IoT hub that can be used in a home, enterprise, city, industrial site, hotel, hospital or some other location.

In many cases the secondary interface can be and is included at relatively low cost often adding one or a few dollars to a device that in many cases may cost over a hundred dollars or even hundreds of dollars depending on the communications device in which the secondary interface is incorporated.

An exemplary method of operating a communications device including a first (primary) communications interface and a second (secondary) communications interface, in accordance with some embodiments, comprises: storing in the communications device, secondary communications network credentials, the secondary communications network credentials being for use via the second communications interface, said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum; communicating via the second interface and a secondary communications network (e.g., a low-power wide-area network (LPWAN) such as a LoRa communications network or a NB-IoT network) with a management system; receiving from the management system configuration information for configuring the communications device to communicate over the first (primary) communications interface; and operating the communications device to communicate, in accordance with the received configuration information, via the first communications interface.

While various features and methods have been described, all embodiments need not include all features or steps mentioned in the summary. Numerous additional features and embodiments are discussed in the detailed description which follows.

BRIEF DESCRIPTION OF THE FIGURES

FIG. 9C shows a third part of FIG. 9.

DETAILED DESCRIPTION

Figure 1:
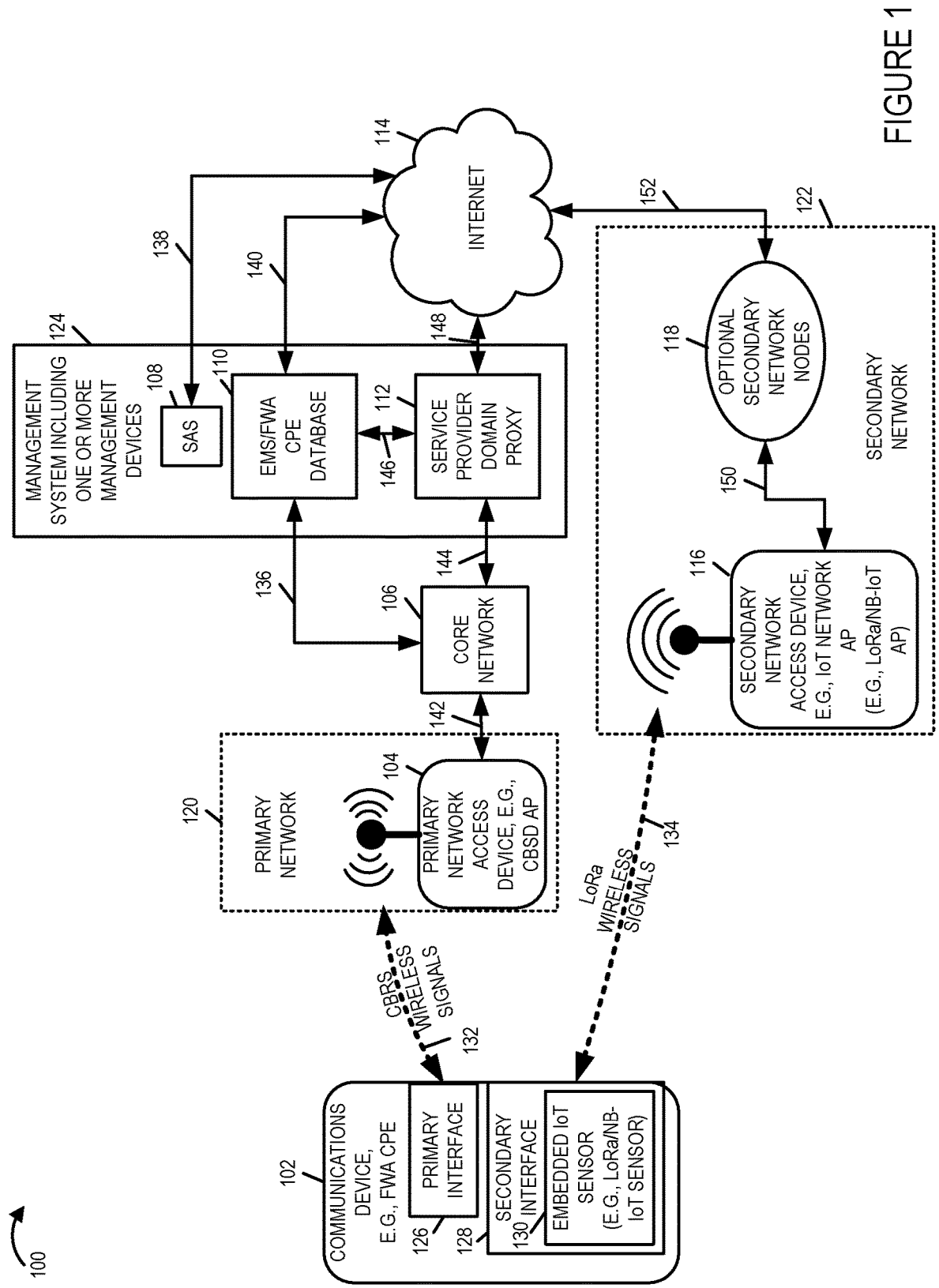
FIG. 1 is a drawing of an exemplary communications system including a communications device, e.g., a high power FWA CPE including an embedded LoRa/NB-IoT sensor, used to facilitate access to a secondary access network, in accordance with an exemplary embodiment.

FIG. 1 is a drawing of an exemplary communications system 100 in accordance with an exemplary embodiment. Exemplary communications system 100 includes a communications device 102, e.g., a FWA customer premises equipment (CPE), a primary network access device 104, e.g., a CBSD AP, a core network node 106, a SAS 108, a Element Management System (EMS)/Fixed Wireless Access (FWA) CPE database 110, a service provider domain proxy 112, Internet 114, a secondary network access device 216, e.g., an Internet of Things (IoT) network AP, e.g., a Long Range/Narrow Band-Internet of Things (LoRa/NB-IoT) AP, and optional secondary network node 118 coupled together as shown in FIG. 1. LoRa refers to sub-GHz unlicensed spectrum available globally across the US, Europe and Asia.

Communications device 102, e.g., a FWA CPE, includes a primary interface 126 and a secondary interface 128. Secondary interface 128 includes an embedded IoT sensor 130, e.g, a LoRA/NB-IoT sensor. The primary network access device 104, e.g., a CBSD AP, is part of primary network 120. The secondary network access device 116, e.g., an IoT network AP such as a LoRa/NB-IoT AP, and in some embodiments, optional secondary network nodes 118 are included as part of a secondary network 122. The SAS 108, EMS/FWA CPE database 110 and service provider domain proxy 112 are included as part of a management system 124 including one or more management devices.

Communications device 102, e.g., a FWA CPE, uses primary interface 126 to communicate with primary network access device 104, e.g., a CBSD AP, via wireless link 132 over which CBRS wireless signals are communicated. Communications device 102, e.g., a FWA CPE, uses secondary interface 128 to communicate with secondary network access device 116, e.g., an IoT network AP such as a LoRa/NB-IoT AP, via wireless link 134 over which wireless signals, e.g., LoRa wireless signals, are communicated.

Primary network access device 104 is coupled to core network 106 via communications link 142. The core network 106 is coupled to EMS/FWA CPE database via communications link 136. The core network 106 is coupled to the service provider domain proxy 112 via communications link 144. The EMS/FWA CPE database 110 is coupled to service provider domain proxy 112 via communication slink 146. The SAS 108, EMS/FWA CPE database 110 and service provider domain proxy 112 are coupled to the Internet 114 via communications links (138, 140, 148), respectively.

Secondary network access device 116, e.g., an IoT network AP such as a LoRa/NB-IoT AP, is coupled to optional secondary network nodes 118 via communications link 150. The optional secondary network nodes 118 are coupled to the Internet 114 via communications link 152.

FIG. 1 illustrates a first use case example, in accordance with the present invention, which is a use case example of high power FWA CPE management using embedded LoRa/NB-IoT access, e.g., an embedded LoRa/NB-IoT sensor 130 in the CPE 102. The CPE 102 can be, and sometimes is, minimally provisioned to ensure secure access through a secondary network 122, e.g. a LoRa access network. In various embodiments, an embedded IoT sensor 130, supporting LoRa access, which was included in CPE 102 together with the subscriber profile can be, and sometimes is, used to provision and bring the CPE 102 online. In an operational state the CPE 102 can be accessed through the primary network access device 104, e.g., a CBSD AP of primary network 120, e.g. a CBRS network, as well as through the secondary network access device 116, e.g., LoRa AP 116 of secondary network 122, e.g., a LoRa access network. Since LoRa can operate at very low power, even battery backup can be used to manage/configure/restore service in case of a catastrophic failure of CBRS access/device/interface. This is especially true, when CBRS channel get withdrawn due to incumbent movement; thus the inclusion of secondary access via LoRa is especially useful and beneficial in CBSD embodiments. The LoRa access can be, and in some embodiments is, also used to perform software updates on the CBSD. This approach minimizes downtime and operating expenses (opex) (expensive truck rolls, technician visits), and enhances service reliability.

Figure 2:
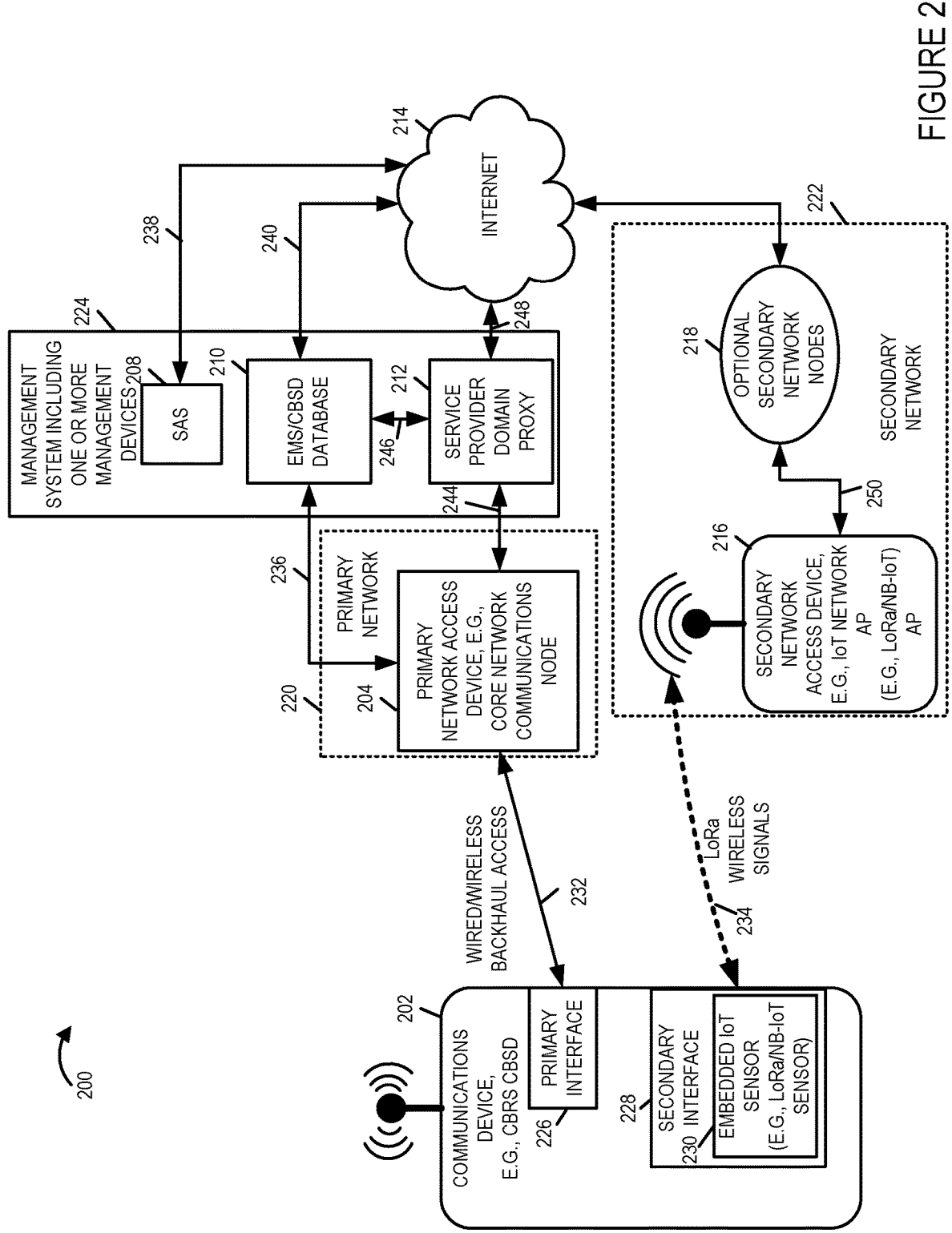
FIG. 2 is a drawing of an exemplary communications system including a communications device, e.g., a CBRS CBSD including an embedded LoRa/NB-IoT sensor, used to facilitate access to a secondary access network, in accordance with an exemplary embodiment.

FIG. 2 is a drawing of an exemplary communications system 200 in accordance with an exemplary embodiment. Exemplary communications system 200 includes a communications device 102, e.g., a CBRS CBSD, a primary network access device 204, e.g., a core network communications node, a core network node 106, a SAS 208, a EMS/CBSD database 210, a service provider domain proxy 212, Internet 214, a secondary network access device 216, e.g., an IoT network AP, e.g., a LoRa/NB-IoT AP, and optional secondary network node 218 coupled together as shown in FIG. 2.

Communications device 202, e.g., a CBRS CBSD, includes a primary interface 226 and a secondary interface 228. Secondary interface 228 includes an embedded IoT sensor 230, e.g., a LoRA/NB-IoT sensor. The primary network access device 204, e.g., a core network communications node, is part of primary network 220. The secondary network access device 216, e.g., an IoT network AP such as a LoRa/NB-IoT AP, and in some embodiments, optional secondary network nodes 218 are included as part of a secondary network 222. The SAS 208, EMS/CBSD database 210 and service provider domain proxy 212 are included as part of a management system 224 including one or more management devices.

Communications device 202, e.g., a CBRS CBSD, uses primary interface 226 to communicate with primary network access device 204, e.g., a core network communications node, via wired/wireless backhaul link 232 over which wired/wireless backhaul signals are communicated. Communications device 202, e.g., a CBRS CBSD, uses secondary interface 228 to communicate with secondary network access device 216, e.g., an IoT network AP such as a LoRa/NB-IoT AP, via wireless link 234 over which wireless signals, e.g., LoRa wireless signals, are communicated.

Primary network access device 204, e.g., a core network communications node, is coupled to EMS/CBSD database 210 via communications link 236. The primary network access device 204, e.g., a core network communications node, is coupled to service provider domain proxy 212 via communications link 244. The EMS/CBSD database 210 is coupled to the service provider domain proxy 212 via communications link 214. The SAS 208, EMS/CBSD database 210 and service provider domain proxy 212 are coupled to the Internet 214 via communications links (238, 240, 248), respectively.

Secondary network access device 216, e.g., an IoT network AP such as a LoRa/NB-IoT AP, is coupled to optional secondary network nodes 218 via communications link 250. The optional secondary network nodes 218 are coupled to the Internet 214 via communications link 252.

FIG. 2 illustrates a second use case example, in accordance with the present invention, which is a use case example of CBRS-CBSD (eNB) management using an embedded LoRA/NB-IoT sensor 130 which is used to provide secondary access. The CBSD 202 can be, and sometimes is, minimally provisioned to ensure secure access through a secondary network 222, e.g. a LoRa access network. In various embodiments, an embedded IoT sensor 230, supporting LoRa access, which was included in CBSD 202 together with the subscriber profile can be, and sometimes is, used to provision and bring the CBSD 202 online. In an operational state the CBSD 202 can be accessed through the primary network access device 204, e.g., a core network communications node, of primary network 220, e.g. a backhaul network, as well as through the secondary network access device 216, e.g., LoRa AP 216 of secondary network 222, e.g., a LoRa access network. Since LoRa can operate at very low power, even battery backup can be used to manage/configure/restore service in case of a catastrophic failure on backhaul/devie/interface. The LoRa access can be, and in some embodiments is, also used to perform software updates on the CBSD. This approach minimizes downtime and operating expenses (opex) (expensive truck rolls, technician visits), and enhances service reliability.

Figure 3:
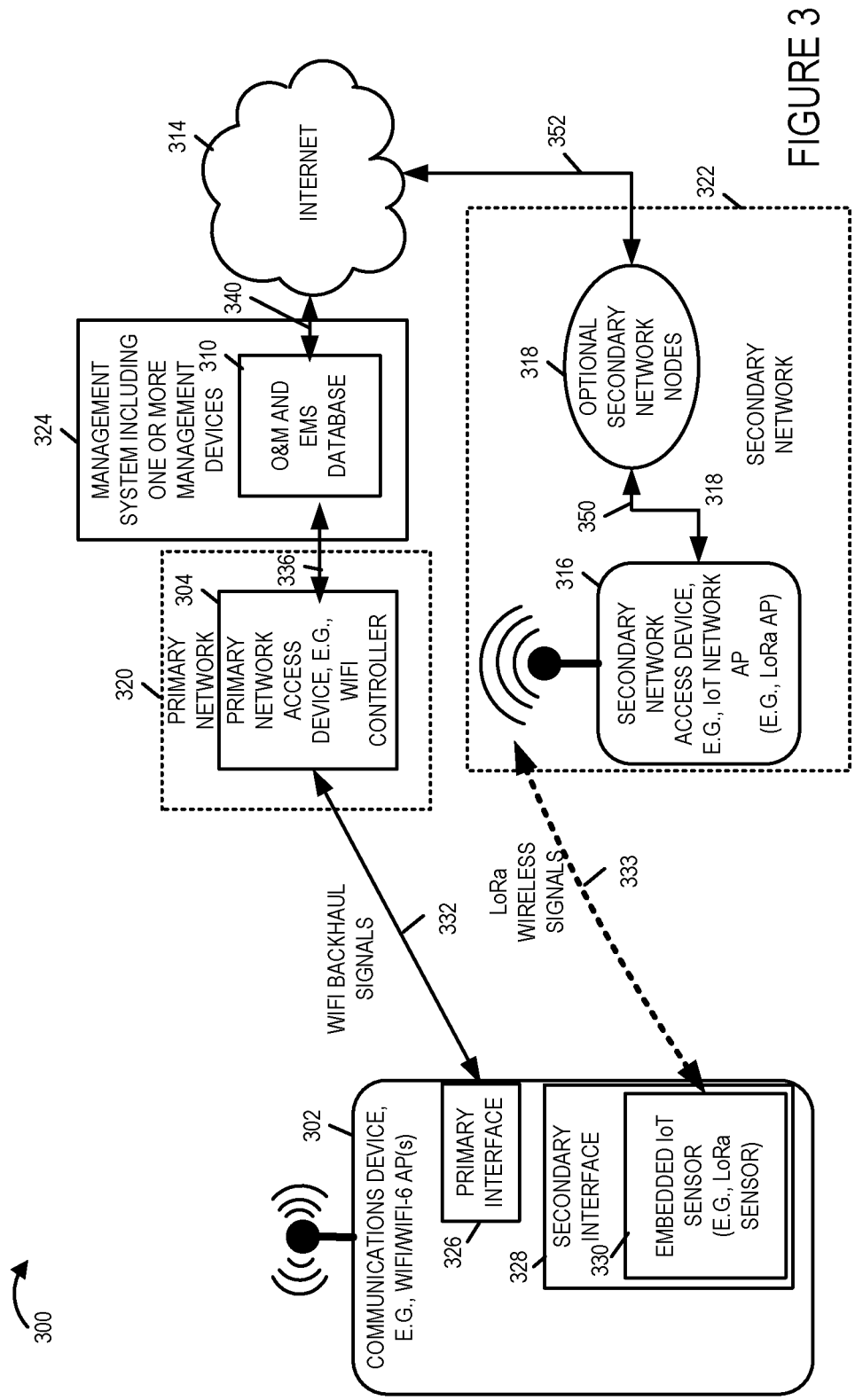
FIG. 3 is a drawing of an exemplary communications system including a communications device, e.g., a WiFi access point including an embedded LoRa sensor, used to facilitate access to a secondary access network, in accordance with an exemplary embodiment.

FIG. 3 is a drawing of an exemplary communications system 300 in accordance with an exemplary embodiment. Exemplary communications system 300 includes a communications device 202, e.g., a WiFi/WiFi-6 AP(s), a primary network access device 304, e.g., a WiFi controller, an Operations and management (O&M) and EMS database 310, Internet 314, a secondary network access device 316, e.g., an IoT network AP, e.g., a LoRa AP, and optional secondary network node 318 coupled together as shown in FIG. 3.

Communications device 302, e.g., a WiFi/WiFi-6 AP(s), includes a primary interface 326 and a secondary interface 328. Secondary interface 328 includes an embedded IoT sensor 330, e.g., a LoRa sensor. The primary network access device 304, e.g., a WiFi controller, is part of primary network 320. The secondary network access device 316, e.g., an IoT network AP such as a LoRa AP, and in some embodiments, optional secondary network nodes 318 are included as part of a secondary network 322. The O&M and EMS database 310 is included as part of a management system 324 including one or more management devices.

Communications device 302, e.g., a WiFi/WiFi-6 AP(s), uses primary interface 326 to communicate with primary network access device 304, e.g., a WiFi controller, via WiFi backhaul link 332 over which WiFi wired/wireless backhaul signals are communicated. Communications device 302, e.g., a WiFi/WiFi-6 AP(s), uses secondary interface 328 to communicate with secondary network access device 316, e.g., an IoT network AP such as a LoRa AP, via wireless link 334 over which wireless signals, e.g., LoRa wireless signals, are communicated.

Primary network access device 304, e.g., a WiFi controller, is coupled to O&M and EMS database 310 via communications link 336. The O&M and EMS database 310 CBSD database 210 is coupled to the Internet 314 via communications link 340.

Secondary network access device 316, e.g., an IoT network AP such as a LoRa AP, is coupled to optional secondary network nodes 318 via communications link 350. The optional secondary network nodes 318 are coupled to the Internet 314 via communications link 352.

FIG. 3 illustrates a third use case example, in accordance with the present invention, which is a use case example of WiFi-WiFi-6 AP commissioning/management using an embedded LoRa sensor 330 which is used to provide secondary access. The WiFi AP 302 can be, and sometimes is, minimally provisioned to ensure secure access through a secondary network 322, e.g. a LoRa access network. In various embodiments, an embedded IoT sensor 330, supporting LoRa access, which was included in WiFi AP 302 together with the subscriber profile can be, and sometimes is, used to provision and bring the WiFi AP 302 online. In an operational state the WiFi AP 302 can be accessed through the primary network access device 304, e.g., a WiFi controller, of primary network 320, e.g. a backhaul network, as well as through the secondary network access device 316, e.g., LoRa AP 316 of secondary network 322, e.g., a LoRa access network. Since LoRa can operate at very low power, even battery backup can be used to manage/configure/restore service in case of a catastrophic failure on backhaul/device/interface. The LoRa access can be, and in some embodiments is, also used to perform: software updates, configuration, and reset to factory defaults, on the WiFi AP 302. This approach minimizes downtime and operating expenses (opex) (expensive truck rolls, technician visits), and enhances service reliability.

Figure 4:
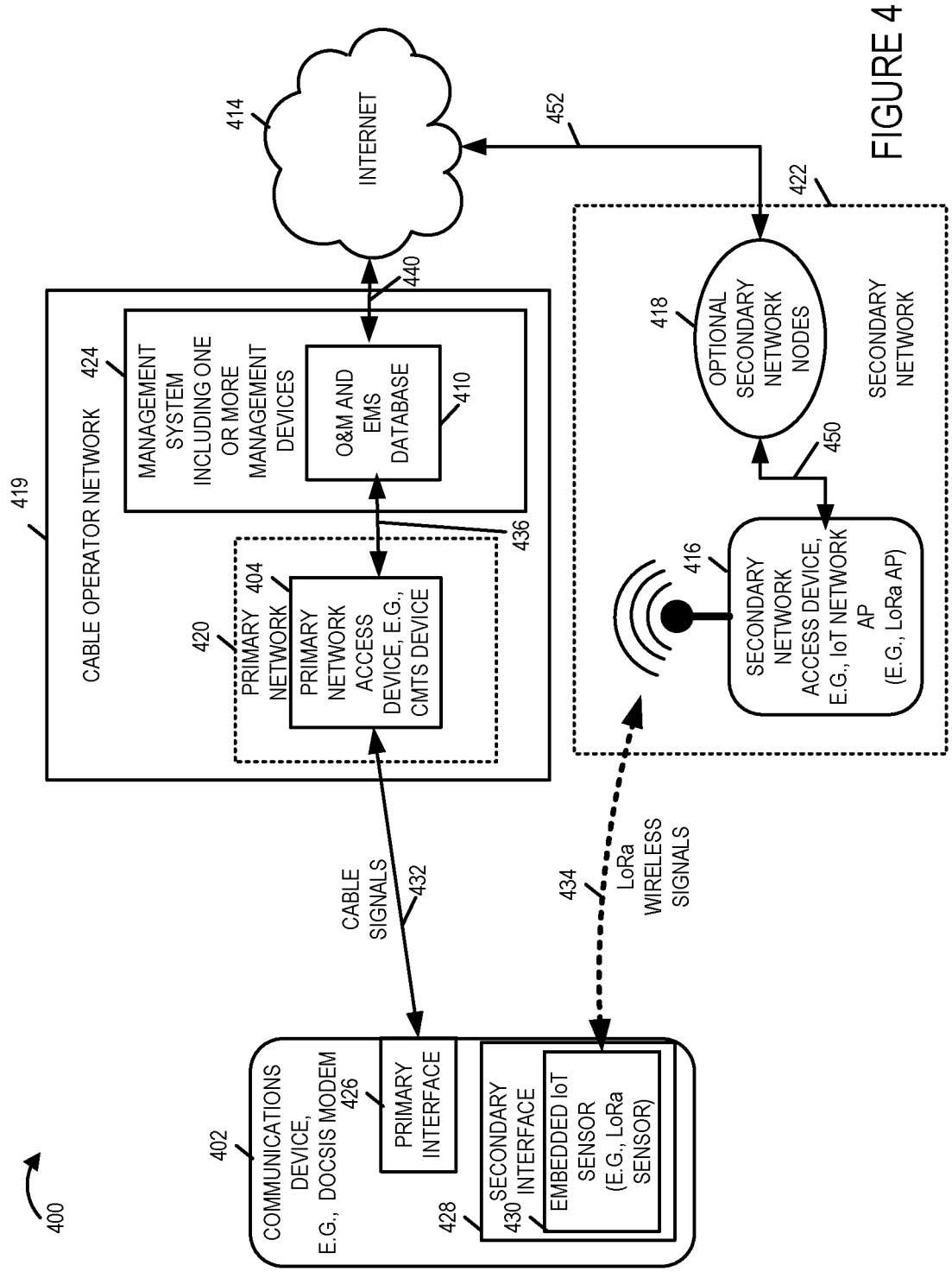
FIG. 4 is a drawing of an exemplary communications system including a communications device, e.g., a Docsis modem, including an embedded LoRa sensor, used to facilitate access to a secondary access network, in accordance with an exemplary embodiment.

FIG. 4 is a drawing of an exemplary communications system 400 in accordance with an exemplary embodiment. Exemplary communications system 400 includes a communications device 402, e.g., a DOCSIS modem, a primary network access device 404, e.g., a Cable Modem Termaination System (CMTS) device, an O&M and EMS database 410, Internet 414, a secondary network access device 416, e.g., an IoT network AP, e.g., a LoRa AP, and optional secondary network node 418 coupled together as shown in FIG. 4.

Communications device 402, e.g., a DOCSIS modem, includes a primary interface 426 and a secondary interface 428. Secondary interface 428 includes an embedded IoT sensor 430, e.g., a LoRa sensor. The primary network access device 404, e.g., a CMTS device, is part of primary network 420. The secondary network access device 416, e.g., an IoT network AP such as a LoRa AP, and in some embodiments, optional secondary network nodes 418 are included as part of a secondary network 422. The O&M and EMS database 410 is included as part of a management system 424 including one or more management devices. The primary network 420 and management system 424 are included as part of a cable operator network 419.

Communications device 402, e.g., a DOCSIS modem, uses primary interface 426 to communicate with primary network access device 404, e.g., a CMTS device, via cable link 432 over which cable signals are communicated. Communications device 402, e.g., a DOCSIS modem, uses secondary interface 428 to communicate with secondary network access device 416, e.g., an IoT network AP such as a LoRa AP, via wireless link 434 over which wireless signals, e.g., LoRa wireless signals, are communicated.

Primary network access device 404, e.g., a CMTS device, is coupled to O&M and EMS database 410 via communications link 436. The O&M and EMS database 310 CBSD database 410 is coupled to the Internet 414 via communications link 440.

Secondary network access device 416, e.g., an IoT network AP such as a LoRa AP, is coupled to optional secondary network nodes 418 via communications link 450. The optional secondary network nodes 418 are coupled to the Internet 414 via communications link 452.

FIG. 4 illustrates a third use case example, in accordance with the present invention, which is a use case example of Docsis modem commissioning/management using an embedded LoRa sensor 430 which is used to provide secondary access. The Docsis modem 402 can be, and sometimes is, minimally provisioned to ensure secure access through a secondary network 422, e.g. a LoRa access network, e.g., often out of the factory. In various embodiments, an embedded IoT sensor 430, supporting LoRa access, which was included in Docsis modem 402 together with the subscriber profile can be, and sometimes is, used to provision and bring the Docsis modem 402 online. In an operational state the Docsis modem 402 can be accessed through the primary network access device 404, e.g., a CMTS device, of primary network 420, e.g. a backhaul network, as well as through the secondary network access device 416, e.g., LoRa AP 416 of secondary network 422, e.g., a LoRa access network. Since LoRa can operate at very low power, even battery backup can be used to manage/configure/restore service in case of a catastrophic failure on backhaul/device/interface. The LoRa access can be, and in some embodiments is, also used to perform: software updates, configuration, and reset to factory defaults, on the Docsis modem 402. This approach minimizes downtime and operating expenses (opex) (expensive truck rolls, technician visits), and enhances service reliability.

Figure 5:
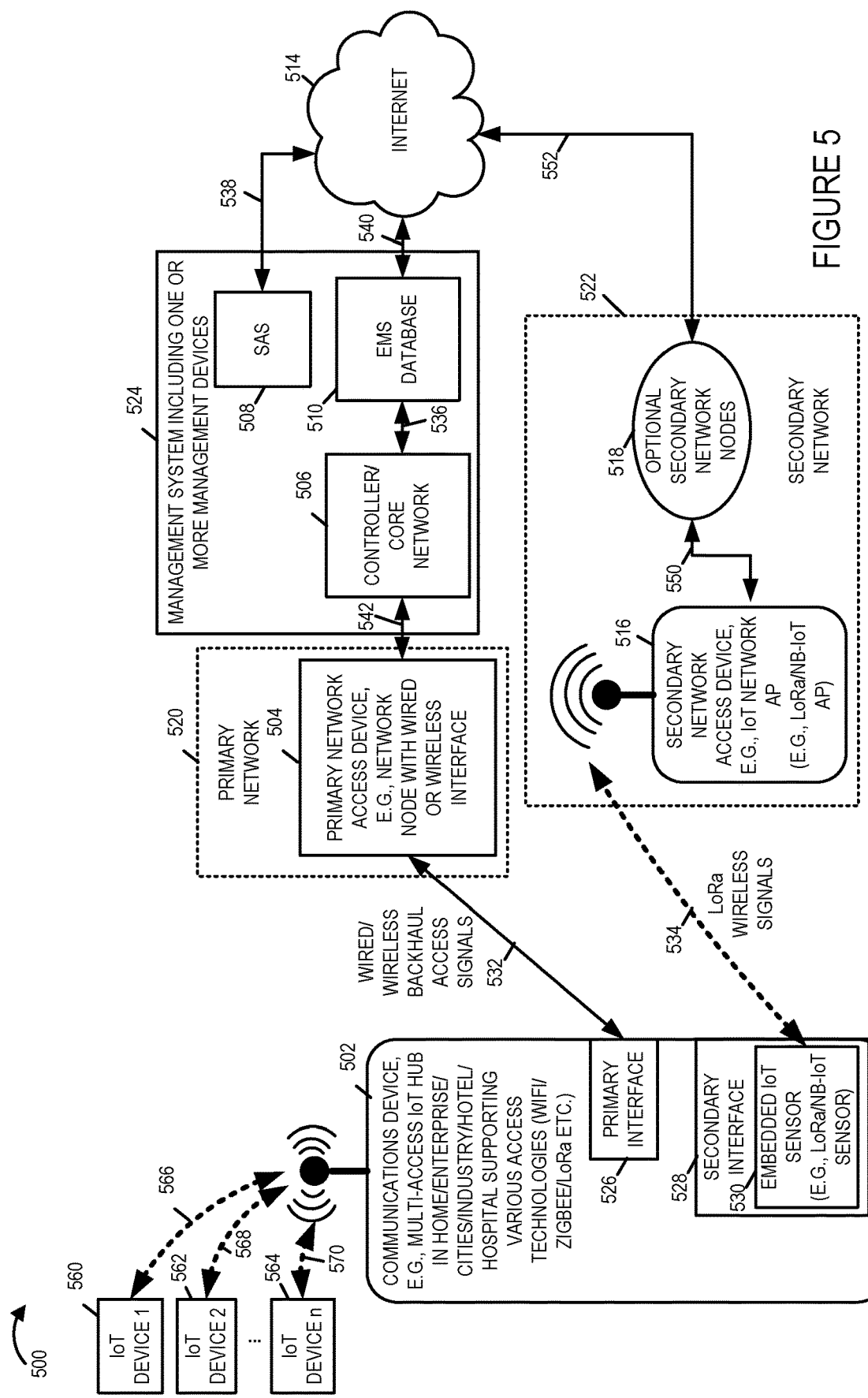
FIG. 5 is a drawing of an exemplary communications system including a communications device, e.g., a multi-access IoT hub, including an embedded LoRa sensor, used to facilitate access to a secondary access network, in accordance with an exemplary embodiment.

FIG. 5 is a drawing of an exemplary communications system 500 in accordance with an exemplary embodiment. Exemplary communications system 500 includes a communications device 502, e.g., a multi-access IoT hub supporting various access technologies such as, e.g. WiFi, ZIGBEE, LoRa, etc., a primary network access device 504, e.g., a network node with wired or wireless interface, a controller/core network 506, a SAS 508, a EMS database 510, Internet 514, a secondary network access device 516, e.g., an IoT network AP, e.g., a LoRa/NB-IoT AP, optional secondary network node 518, and a plurality of IoT devices (IoT device 1 560, IoT device 2 562, . . . IoT device n 564) coupled together as shown in FIG. 5.

Communications device 502, e.g., a multi-access IoT hub supporting various technologies is, e.g., located in a home, enterprise, city wireless infrastructure designated location, industry site, hotel, or hospital. Communications device 502, e.g., a multi-access IoT hub supporting various technologies, includes a primary interface 526 and a secondary interface 528. Secondary interface 528 includes an embedded IoT sensor 530, e.g., a LoRA/NB-IoT sensor. The primary network access device 504, e.g., a network node with wired or wireless interface, is part of primary network 520. The secondary network access device 516, e.g., an IoT network AP such as a LoRa/NB-IoT AP, and in some embodiments, optional secondary network nodes 518 are included as part of a secondary network 522. The controller/core network 516, e.g., a core network including one or more core network nodes, SAS 508, and EMS database 510 are included as part of a management system 524 including one or more management devices.

Communications device 502, e.g., a multi-access IoT hub, uses primary interface 526 to communicate with primary network access device 504, e.g., a network node, via wired/wireless backhaul link 532 over which wired/wireless backhaul signals are communicated. Communications device 502, e.g., a multi-access IoT hub, uses secondary interface 528 to communicate with secondary network access device 516, e.g., an IoT network AP such as a LoRa/NB-IoT AP, via wireless link 534 over which wireless signals, e.g., LoRa wireless signals, are communicated.

Primary network access device 504, e.g., a network node, is coupled to controller/core network 506 via communications link 542. The controller/core network 506 is coupled to the EMS database 510 via communications link 536. The SAS 508 and EMS database 510 are coupled to the Internet 514 via communications links (538, 540), respectively.

Secondary network access device 516, e.g., an IoT network AP such as a LoRa/NB-IoT AP, is coupled to optional secondary network nodes 518 via communications link 550. The optional secondary network nodes 518 are coupled to the Internet 514 via communications link 552.

The IoT devices (IoT device 1 560, IoT device 2 562, . . . , IoT device n 564) are coupled to the communications device 502, e.g., a multi-access Io Thumb, via wireless links (566, 568, . . . , 570), respectively.

FIG. 5 illustrates a fifth use case example, in accordance with the present invention, which is a use case example of multi-access IoT hub 502 commissioning/management using an embedded LoRa/NB-IoT sensor 530 which is used to provide secondary access, e.g., often out of the factory. The multi-access IoT hub 502 can be, and sometimes is, minimally provisioned to ensure secure access through a secondary network 522, e.g. a LoRa access network, e.g., often out of the factory. In various embodiments, an embedded IoT sensor 530, supporting LoRa access, which was included in the multi-access IoT hub 502 together with the subscriber profile can be, and sometimes is, used to provision and bring the IoT hub 502 online. In an operational state the IoT hub 502 can be accessed through the primary network access device 504, e.g., a network node, of primary network 520, e.g. a backhaul network, as well as through the secondary network access device 516, e.g., LoRa AP/NB-IoT AP 516 of secondary network 522, e.g., a LoRa access network. Since LoRa can operate at very low power, even battery backup can be used to manage/configure/restore service in case of a catastrophic failure on backhaul/device/interface. The LoRa access can be, and in some embodiments is, also used to perform: software updates, configuration, and reset to factory defaults, on the multi-access IoT hub 502. This approach minimizes downtime and operating expenses (opex) (expensive truck rolls, technician visits), and enhances service reliability.

Figure 6:
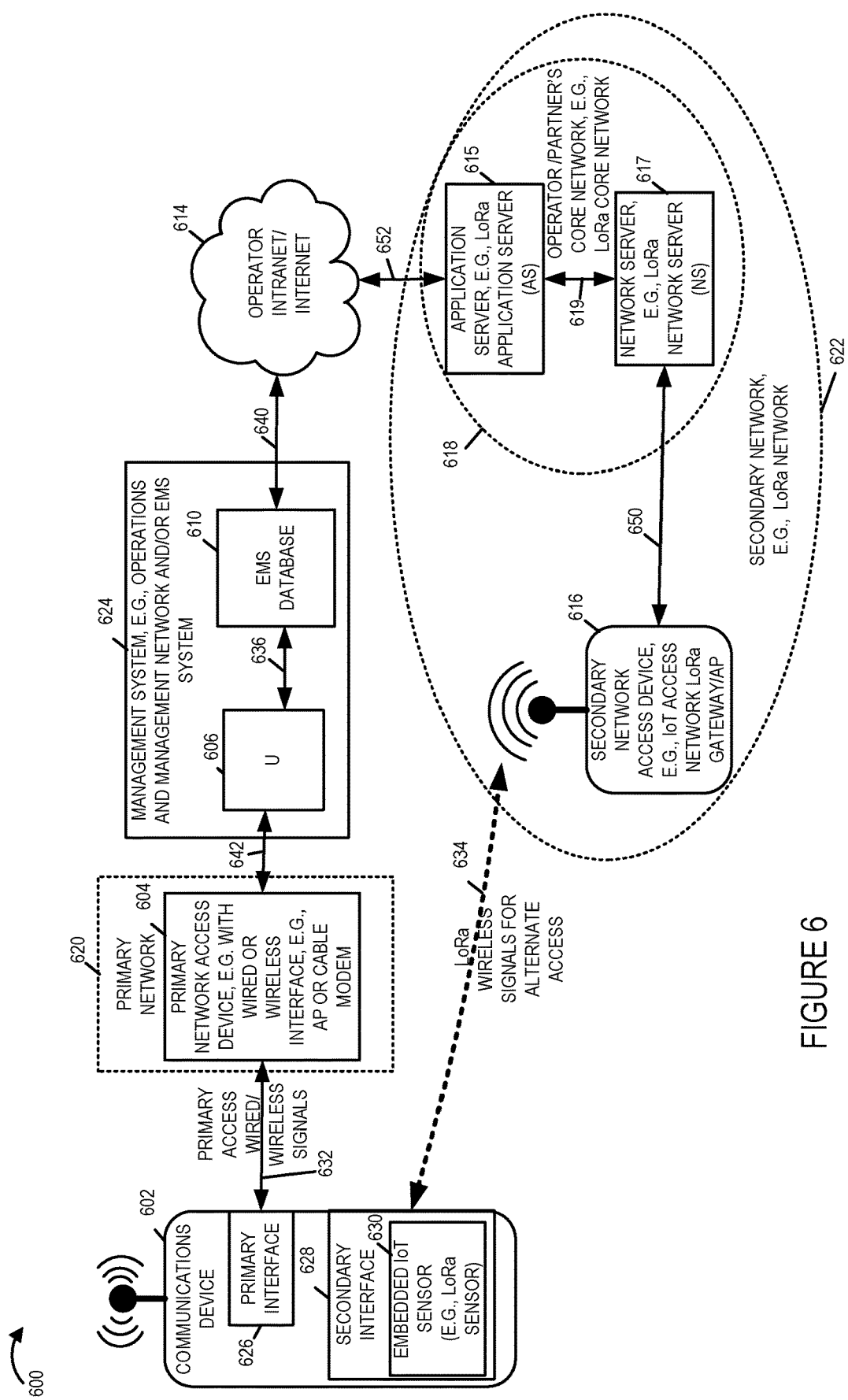
FIG. 6 provides an overview of the various use cases described with respect to FIGS. 1-5, and further provides more detail with regard to an exemplary secondary network, e.g., a LoRa network.

FIG. 6 is a drawing of an exemplary communications system 600 in accordance with an exemplary embodiment. Exemplary communications system 600 includes a communications device 602, a primary network access device 604, e.g., with a wired or wireless interface, such as, e.g., an access point or cable modem, a controller/core network/ core network node U 606, an EMS database 610, operator Intranet/Internet 614, a secondary network access device 616, e.g., an IoT network LoRA gateway/AP, optional secondary network node 518, an application server (AS) 615, e.g, a LoRa applications server, and a network server (NS) 617, e.g., a LoRa network server coupled together as shown in FIG. 6.

Communications device 602 includes a primary interface 626 and a secondary interface 628. Secondary interface 628 includes an embedded IoT sensor 630, e.g., a LoRa sensor. The primary network access device 604, e.g., an AP or cable modem with wired or wireless interface, is part of primary network 620. The secondary network access device 616, e.g., an IoT network gateway/AP such as a LoRa Gateway/AP, and secondary network nodes (AS 615, NS 617) are included as part of a secondary network 622, e.g., a LoRa network. The AS 615 and NS 617 are part of an operator/partner's core network 618, e.g., a LaRa core network.

The controller/core network/core network node U 606 and EMS database 610 are included as part of an operations and management network and EMS system 624 including one or more management devices.

Communications device 602 uses primary interface 626 to communicate with primary network access device 604, e.g., an AP or cable modem, via wired/wireless backhaul link 632 over which primary access wired/wireless signals are communicated. Communications device 602 uses secondary interface 628 to communicate with secondary network access device 616, e.g., an IoT network LoRA gateway/access point, via wireless link 634 over which wireless signals, e.g., LoRa wireless signals, are communicated for alternative access.

Primary network access device 604, e.g., an AP or cable modem, is coupled to controller/core network/core network node U 606 via communications link 642. The controller/core network/core network node U 606 is coupled to the EMS database 610 via communications link 636. The EMS database 610 is coupled to the Internet 614 via communications link 640.

Secondary network access device 616, e.g., an IoT access network LoRa gateway/AP, is coupled to network server 617, e.g., a LoRa network server, via communications link 650. Network server 617 is coupled to application server 615, e.g., a LoRa application server, via communications link 619. Application server 615 is coupled to operator Intranet/Internet 614 via communications link 652.

The IoT devices (IoT device 1 560, IoT device 2 562, . . . , IoT device n 564) are coupled to the communications device 502, e.g., a multi-access Io Thumb, via wireless links (566, 568, . . . , 570), respectively.

FIG. 6 provides an abstraction or overview of the various use cases described with respect to FIGS. 1-5, and further provides more detail with regard to an exemplary secondary network, e.g., a LoRa network. Communications device 602 is, e.g., any of the exemplary communications devices (102, 202, 302, 402 or 502) FIG. 1-5. FIG. 6 illustrates that there is primary access for the communications device 602, which may be wired or wireless, depending on the particular embodiment, and there is an alternative access for the communications device 602, and in some embodiments, LoRa is used for the alternative access.

The communications device 602, e.g., a FWA CPE, CBSD, WiFi AP, Cable modem, or IoT hub, has an embedded LoRa access device 630. The embedded LoRa devices such as exemplary device 630, are simple, inexpensive, have wide reachability, can be minimally provisioned to ensure access through LoRa access network, often out of the factory. For installation of the communications device 602, the LoRa access on it together with the profile information can be used to provision and bring the communications device 602 online. In an operational state the communications device 602 can be accessed through the backhaul network 620, via primary network access device 604, as well as through the LoRa access network 622 via secondary network access device 616, e.g., a LoRa gateway/AP. Since LoRa can operate at very low power, even battery backup can be used to manage/configure/restore service in case of a catastrophic failure on backhaul/device/interface. The LoRa access can be, and in some embodiments is, also used to perform: software updates, re-configuration, and reset to factory defaults, on the communications device 602. This approach minimizes downtime and operating expenses (opex) (expensive truck rolls, technician visits), and enhances service reliability.

Figure 7:
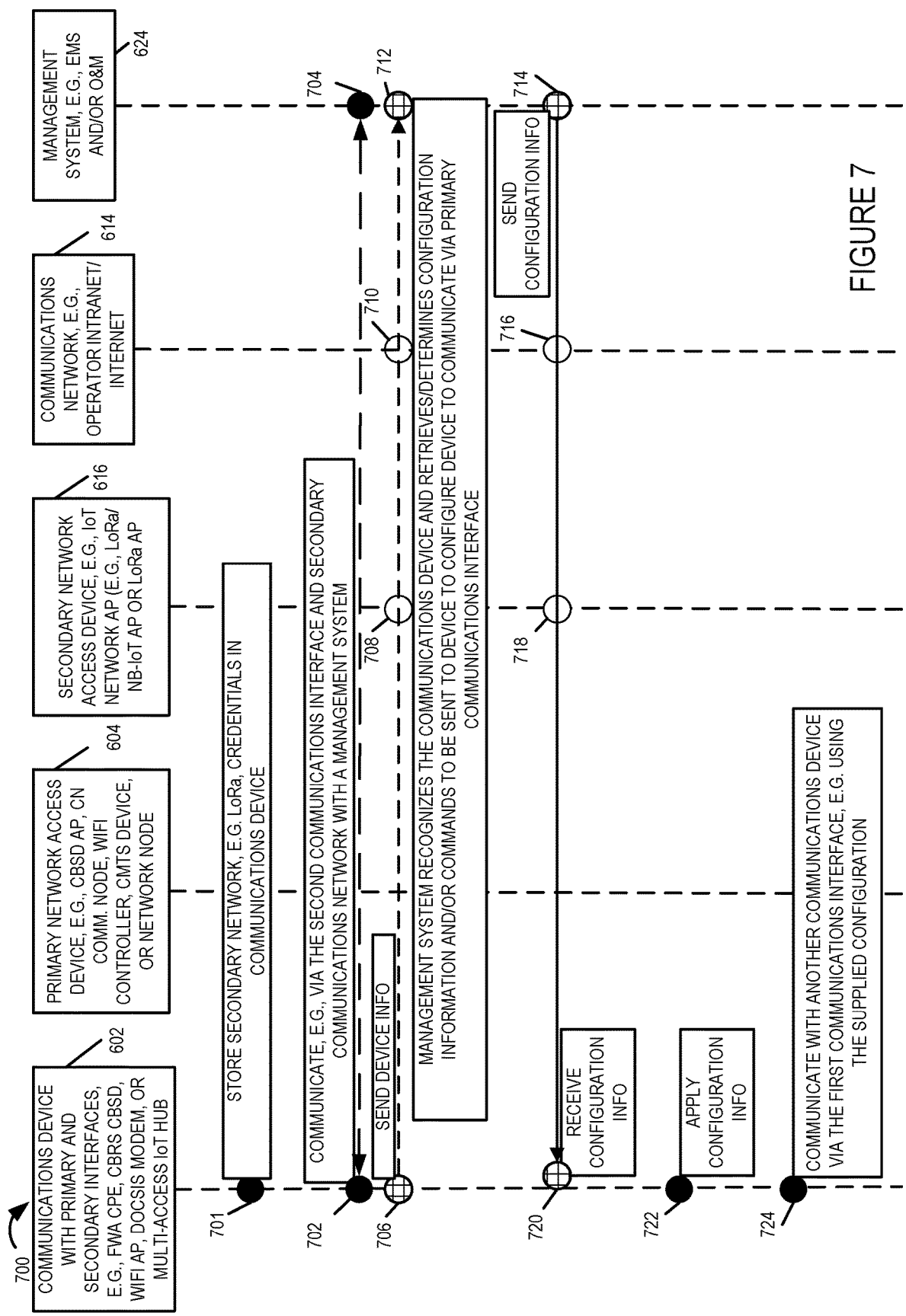
FIG. 7 shows a method of provisioning a communications device and communicating using primary and secondary communications interfaces in one exemplary embodiment.

FIG. 7 shows a method 700 of provisioning a communications device 602 and communicating using primary 626 and secondary 628 communications interfaces of the communications device 602 in one exemplary embodiment.

The method 700 begins in step 701 in which configuration information for the communications device 602 to be used for configuring and communicating via the secondary network , e.g. an LoRa network, is stored. The stored information can include LoRa credentials and/or other information. The information stored in step 701 can, and sometimes does, include a device identifier used to identify the device 602 when communicating on the secondary communications network and information needed to authenticate the device 602 and/or securely communicate over the secondary communications network such as a shared secret or encryption key to be used by the device 602 to secure communications over the secondary network and/or authenticate the device 602. The information stored in step 701 is often loaded by the manufacturer of the device 602 and is present, e.g., stored, in the device 602 prior to being powered on by a user, e.g., at a customer's premises for the first time. As a result of storing the secondary network information in step 701 the device has information sufficient to contact and communicate over the secondary interface and secondary network from the point it is powered on.

In step 702 the communications device 602 communicates, via the secondary communications interface and secondary communications network, with a management system 624, which can be implemented as a single management device in some embodiments or a collection of management devices in other embodiments. In step 704 the management system 624 communicates, via the secondary communications network and the secondary interface, with communications device.

Steps 706 through steps 714 illustrate various steps which may be performed as part of step 702 and/or 704 or in addition to step 702 depending on the embodiment. In step 706 the communications device 602 sends device information to the management system 624. The device information can, and sometimes does, include a device identifier stored in the communications device 602 prior to deployment, e.g., at the time of manufacture, which uniquely identifies the device 602 and is used for purposes of device identification with respect to communications via the secondary communications interface. The information can also include device capability information, e.g., indicating the type of primary interface in the device to be configured, e.g., WIFi, cable modem, LTE, etc., device authentication information and/or other information used to register and/or establish communications with the secondary network and, through the secondary network with the management system 624. As discussed previously the secondary network can be, and sometimes is, an LoRa network.

In step 708 the secondary network access device 616 receives and forwards the device information along the communications path toward the management system 624. In step 710 the communications network 614 receives and forwards the device information along the communications path toward the management system 624.

In step 712 the management system receives the device information that was sent in step 706, recognizes the communications device based on the device identifier that is received via the secondary network and retrieves and/or determines configuration information and/or commands to be sent to the configure the communications device 602 so that it can communicate via the primary communications interface. In some embodiments the configuration information includes transmission power and/or communications band, e.g., frequency band, information that is used to determine transmission power levels and/or frequencies used by the first communications interface. In some embodiments the configuration information includes information provided by an SAS to authorize the communications device 602 to communicate via the primary communications interface. A command instructing the communications device to implement a particular configuration with respect to the first communications device and/or use a particular device identifier with regard to communication over the first interface is sent in step 714 from the management system 624 to the communications device 602. In step 716 the communications network 614 receives and forwards the information, e.g. command(s) and/or configuration information along a communications path toward the communications device 602. In step 720 the secondary network access device 616 receives and forwards the information, e.g. command(s) and/or configuration information along a communications path toward the communications device 602. In step 720 the communications device 602 receives the command(s) and/or configuration information and then in step 722 the communications device applies the configuration information, e.g., sets the maximum transmit power level, frequency band or bands to be used and device identifier to be used for communication via the first communications interface.

Once the configuration information has been loaded and stored in the device's memory, the processor of the communications device 602 controls the device 602, in step 724 to communicate with another communications device via the first communications interface, e.g., using the supplied configuration information which may, and often does, include a device identifier, an encryption key and/or shared secret to be used for communication via the first communications interface.

Once configured the communication in step 724 may, and often does, involve the sending of user application data, e.g., voice data for a call, video data for a video application or text data for text messages or word processing documents, e.g., sent to or received from another communications device via the primary communications network. Communication in step 724 can also include communication of new or updated first communications interface configuration information. For example, in step 720 basic configuration can be received which requires relatively little data to be received but with the information sufficient to authorize and enable at least a minimal level of communication via the primary communications interface. In some embodiments the configuration information 720 is a value or configuration indicator identifying or specifying which one of a plurality of preloaded default configurations the communications device should use for communication, e.g., initial communication, over the primary communications interface. Once active the higher data rate primary communications interface and be used for configuration updates and/or the transmission of user data.

In some but not necessarily all embodiments communication via the secondary interface is restricted to device configuration and control information, e.g., authentication, registration and control information, with application data being required to be communicated via the primary communications network. The secondary communications interface with its relatively long range but low average data rate compared to the primary communications interface in some embodiments is well suited for such a control and configuration application. In some embodiments communications over the secondary network is limited to initial configuration and configuration/control operations implemented when the primary communications interface is unavailable due to configuration or other failure. Given that the use of the secondary network interface is limited in some embodiments to device management and control including device configuration, the amount of data transmitted via the second communications network is relatively small compared to the amount of data transmitted over the primary communications interface allowing a large number of devices to share and used the secondary network in the discussed manner for control and configuration.

Having explained how a communications device 602 can be initially configured and controlled via the secondary communications interface upon deployment or initial use, additional use of the secondary communications interface will be discussed with respect to FIG. 8.

Figure 8:
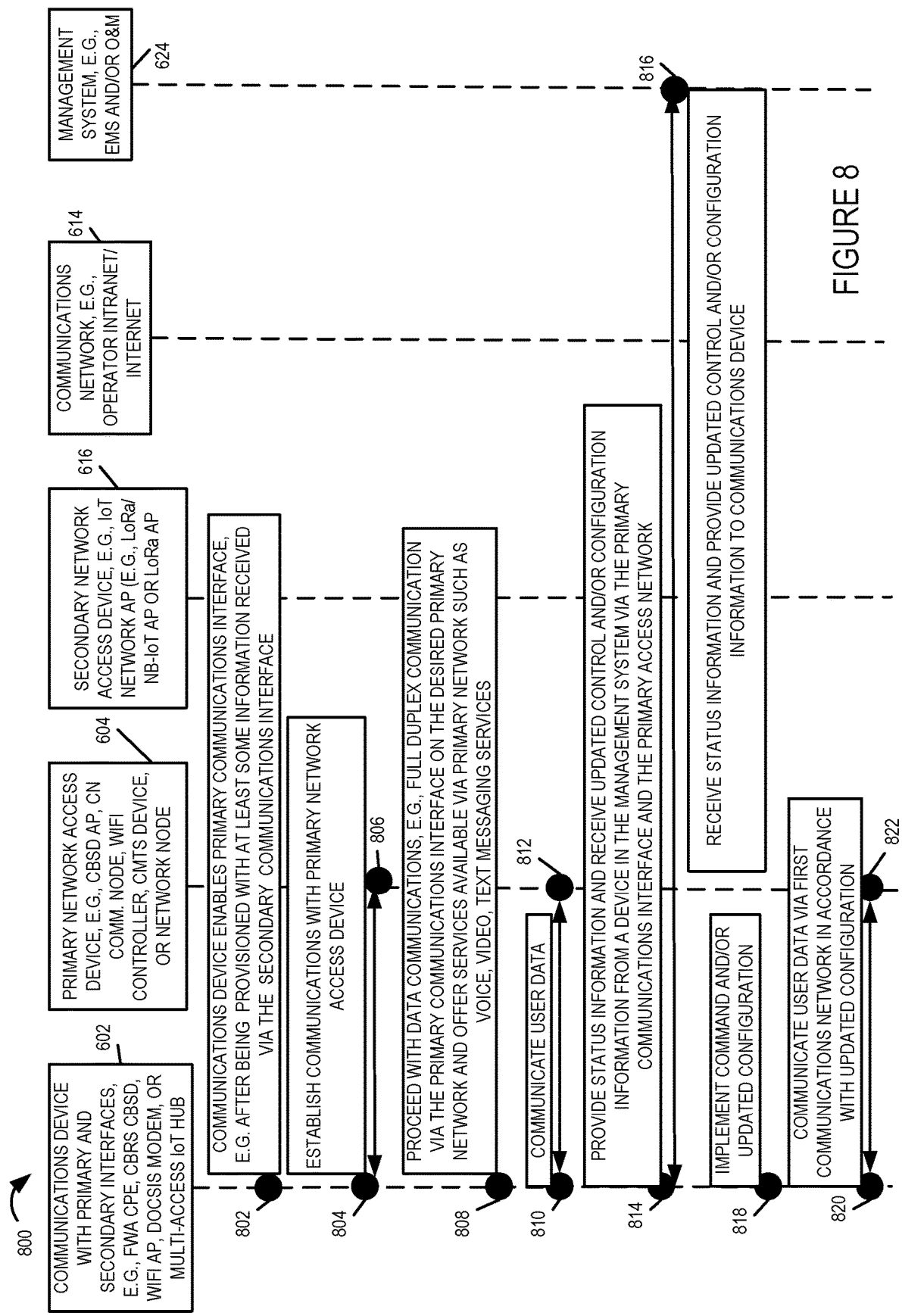
FIG. 8 shows an exemplary method of communicating and updating configuration information after the provisioning shown in FIG. 7 has been completed.

FIG. 8 shows an exemplary method 800 of communicating and updating configuration information after the provisioning shown in FIG. 7 has been completed. The method shown in FIG. 8 may be implemented, e.g., after a device is powered off or inactive but following initial configuration as discussed with regard to the method of FIG. 7.

In step 802 the communication device enables the primary communications interface, e.g., using the configuration information previously obtained via the secondary communications interface. In step 804 communications is then established with a primary network access device 604, e.g., a wireless access point or device used to connect the primary communications network to the communications device. Step 806 represents the primary network access device 604 receiving and/or sending information to the communications device and authenticating/registering the communications device 602 if necessary for communication via the primary communications network. Once communications with the primary network access point is established, the communications device 602 can proceed to communicate with other devices via the primary network access point 604, as indicated by step 808. The bi-directional communication of data between the communications device 602 and the access point 604 is represented by steps 810 and 812. In step 810 the communications device 602 sends and/or receives data via the access point 604 and primary communication network. The data may be part of a voice call with another device, video session, text message operation and/or another user application such as using the Internet or browsing the Internet for one or more items to purchase or for information.

With the primary communications interface active, in step 814 the communications device 602 uses the primary communications interface to provide device status and/or information to the management system 624 and to receive updated configuration and/or control information from the management system. Step 816 represents the management system 624 receiving information from the communications device 602 and responding with new or updated on configuration or control commands. Thus it should be appreciated that the higher speed primary communications interface is used as the main communications channel for not only user data but also control and configuration information when the primary communications interface is enabled and functional with the secondary interface being available for supporting control and configuration operations when there is a failure with regard to the primary communications network or primary communications interface.

Following the receipt of updated configuration information in step and/or a command, the communications device 602 implements the new configuration and/or command in step 818. Then in step 820 the communications device 602 resumes or initiates new communication with one or more devices via the primary network access device 604. Step 822 represents the primary network access point 604 communicating data to/from the communications device 602 as part of the device's communication via the first communications network with another device. For example the communications device 602 could be a cell phone or computer which in step 820 communicates with another cell phone or computer via access point 604.

Thus from the FIG. 8 discussion it should be appreciated that when operational the primary communications interface can be, and sometimes is, used for device and/configuration updates or control and that the secondary communications interface need not be used for this purpose while connectivity exists via the primary communications network interface.

It should be appreciated that the secondary communications interface is not only useful for initial configuration of the primary communication interface but can also be used to reconfigure or control the communications device in the event of a failure with regard to communication via the primary interface. For example in the case of a loss of power the primary interface may become disabled and the configuration out of date or the authorization to use primary network resources may expire and need to be reauthorized without use of the primary network interface.

Figure 9:
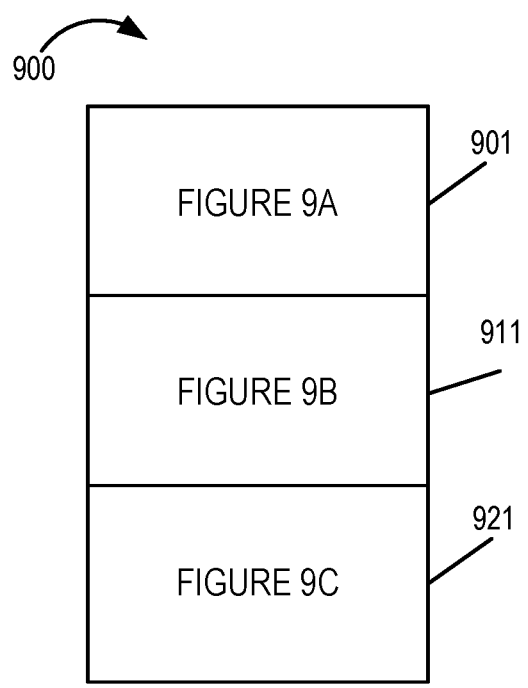
FIG. 9 is a diagram showing how FIGS. 9A, 9B, and 9C can be combined to form a single figure referred to as FIG. 9 that shows the steps of detecting and mitigating a communications failure with respect to a primary communications interface using a secondary wireless communications interface in accordance with one exemplary embodiment.
Figure 9A:
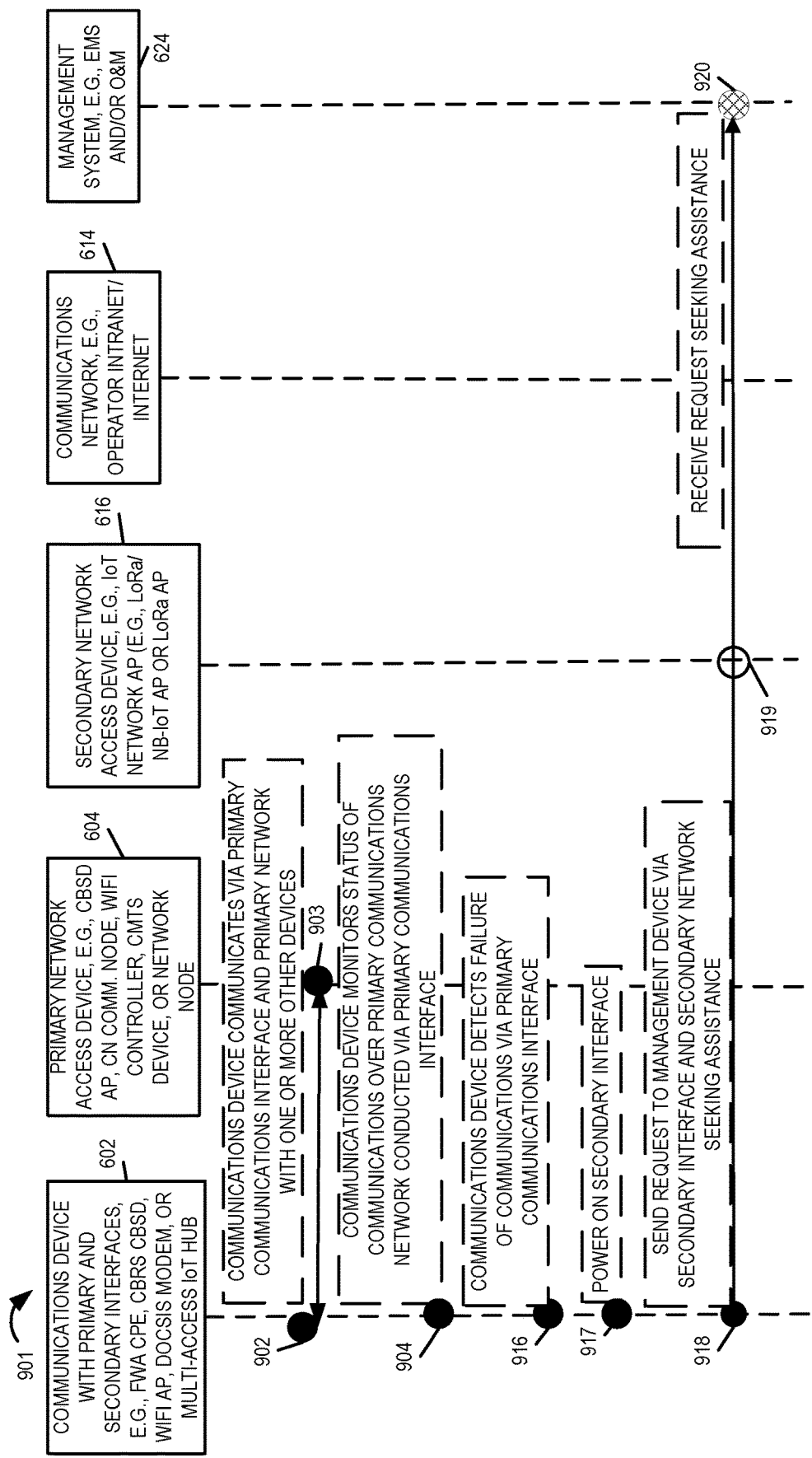
FIG. 9A shows a first part of FIG. 9.
Figure 9B:
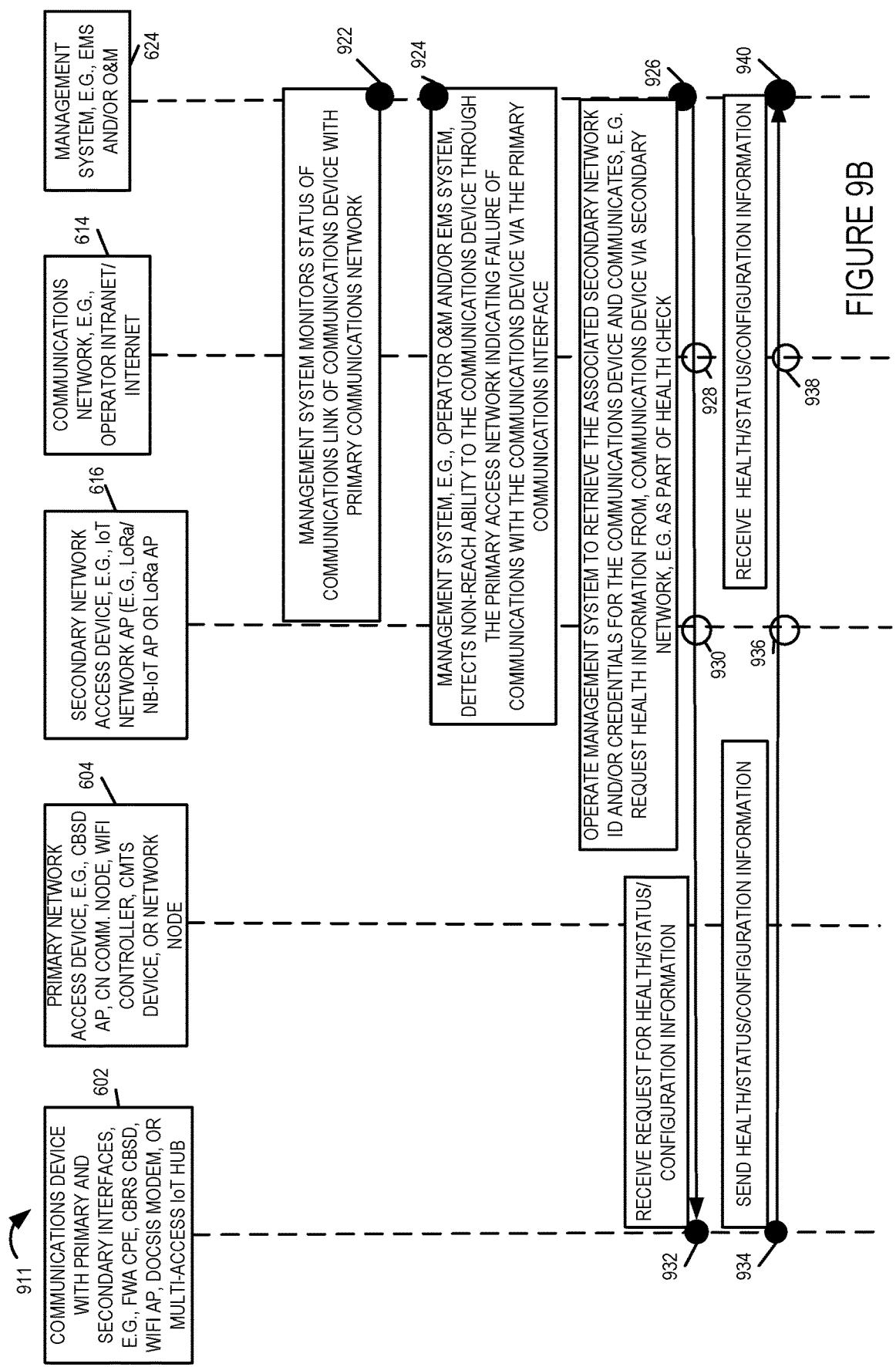
FIG. 9B shows a second part of FIG. 9.

FIG. 9, shows a method 900 which includes the combination of FIGS. 9A, 9B, and 9C identified by reference numbers 901, 911 and 921 respectively. The method 900 can be, and sometimes is, implemented to restore or reconfigure the primary network interface via information and/or commands communicated from the management system via the secondary network and obtained via the secondary communications interface of the communications device 602.

FIG. 9 shows the steps of detecting and mitigating a communications failure with respect to a primary communications interface using a secondary wireless communications interface in accordance with one exemplary embodiment.

The method 900 begins in step 902 which can be seen in FIG. 9A with the communications device 602 communicating via the primary communications interface with another communications device and/or the management system 624. Step 903 represents the access point of the primary network sending and receiving information as part of the communications that is implemented in step 902.

While the communications device is successfully using the primary communications interface a fault may occur, e.g., wire power outage may occur at the communications device 602, interference or use of a higher priority device may prevent use of the spectrum, e.g., frequency band being used by the communications device 602 or a hardware fault may cause a communications failure with respect to the primary communications interface. The failure may result in the communications device 602 losing the ability to communicate via the primary interface due to a configuration setting or for some other reason such as power loss. To reactivate the primary interface the management system 624 may need to supply updated configuration information and/or authorization for the primary interface to use communications resources and or a particular transmit power level.

In the FIG. 9 example either the communications device 602 or the management system 624 may detect a communications failure over the primary communications interface which prevents communications with the communications device 602 via the primary interface. Following detection of the communications failure with respect to the primary communications interface, communication is restored via control and/or configuration information being provided via the secondary interface with the communications device optionally supplying status and/or configuration information to the management system to facilitate the management determining what action or configuration change should be made to restore communications functionality, e.g., at least a minimal level of functionality, to the first communications interface.

The method of FIG. 9, which comprises the combination of FIG. 9A FIG. 9B, and FIG. 9C, begins in step 902 with the communications device using the primary interface to communicate with one or more other devices, e.g., communications devices and/or a management system device. Step 902 occurs after the device 602 has already been configured to use the primary interface, e.g., as described with regard to FIG. 7. Step 903 represents the primary network access device 604 sending and receiving data and/or other information to/from the communications device to support step 902, e.g., with the access node 604 being an intermediate node through which the communicated information passes.

Step 904, 916, and 918 relate to the case where the communications device 602 monitors communications via the first communications interface and will request assistance from the management system in the event of detailing a communications failure on the first communications interface. These steps need not be performed in embodiments where detection of a communications failure and reconfiguration is initiated from the network side, e.g., by the management system 624. However, in some embodiments both the management system 624 and the communications device monitor for communications failures and the device 602 or system 624 which detects the failure first will begin the process of restoring service to the communications device's primary communications interface. Steps 922, 924 926 relate to the process of the management system 624 detecting a communications failure and initiating the communications restoration process. Thus it should be appreciated that steps 904, 916 and 918 may be performed in some cases and in other cases where the management system 624 detects the communications failure steps 922, 924 and 916 are performed. Following detection of a communications failure the restoration process using the secondary interface will proceed.

In the case of monitoring and communications failure detection by the communications device 602, steps 904, 916 and 918 are performed. In step 904 the communications device 602 monitors the status of communications over the primary communications network conducted via the primary communications interface. In step 916 the communications device 602 detects a failure of communications via the primary communications interface, e.g., an inability to send and/or receive communications, e.g., data, via the primary communications interface. In response to detecting the communications failure in step 916, operation proceeds to step 918 in which the communications device 602 sends a request to a management device in the management system 624 via the secondary interface and secondary network seeking assistance with regard to restoring communication via the primary interface. In step 920 the management system 624 receives the request for assistance send from the communications device 602 which detected a communications fault. As part of the request the communications device 602 may, and sometimes does, send current configuration information, information on power availably at the communications device, e.g., whether wired power or only battery power is available and/or other information including information about the last successfully used configuration which is different from the current primary interface configuration which is no longer functional. By receiving information about the current and previous configuration as well as other device information, the management system 624 is apprised, via the secondary communications interface, of information which can be useful in determining what action to take and/or what configuration should be used on the primary communications interface.

In the case where the management system 624 monitors and detects a communications fault with regard to the primary communications interface of device 602, steps 922 through 940 shown in FIG. 9B are performed. In step 922 the management system 624 monitoring the status of the communications link of the communications device 602 with the primary communications network, e.g., by monitoring communications to and/or from the first communications interface of the communications device 602. In step 924 the management system 624 detects a communications fault with respect to the primary communications interface of communications device 602, e.g., non-reachability of the communications device 602 through the primary access network. This may be done by the management system 624 detecting a failure to receive an expected registration message sent by the communications device 602 at predetermined intervals to maintain the primary communications link and/or detecting a failure to respond to a message or signal from the management system 624 sent to the primary communications interface via the primary communications network.

In response to detecting a communications failure with respect to the primary communications interface of device 602, operation proceeds to step 926 in which the management system 624 retrieves the associated secondary network ID and/or other information required to contact the communications device 602 via the secondary communications interface and secondary communications network. Then in step 926 the management system 624 sends a message to the communication device 602 via the secondary communications network as evidenced by forwarding steps 928, 930. In step 932 the communications device 602 receives, via its secondary interface and the secondary communications network, the request for health, status and/or configuration information. In step 934 the communications device 602 responds via the secondary communications interface, e.g., by providing the requested information which may be the same or similar to that included in the request for assistance sent in step 918 in embodiments where the failure is detected by the communications device. In step 934 the communications device 602, in some embodiments, sends not only its current configuration and status information but also indicates the last configuration that was used to successfully communicate via the first interface that was different form the configuration that was in use when the failure occurred. The request for health/status/information is optional in some embodiments. In at least some embodiments the management system can access stored configuration information and determine device status based on whether or not it can be reached via the primary communications network. In at least some such cases the management system can send commands and/or reconfiguration information, via the secondary network, to the communications device 602 when it becomes unreachable via the primary communications network without first receiving status/health and/or configuration information from the communications device via the secondary network.

In step 940 the management system 624 receives the health/status and/or configuration information sent via the secondary communications interface and secondary communications network. Steps 936 and 938 represent the receiving and forwarding of the health/status/configuration by the secondary network access device 616 and communications network 614.

With the management system 624 in communication with the communications device 602, and in some cases having received status/configuration/health information from the device in either steps 920 and/or 940 operation proceeds to step 950 shown in FIG. 9C. In step 950 the management system 624 sends a command and/or configuration information to the communications device 602 to facilitate restoration of at least a minimal level of communication via the primary communications interface of the device 602. In some embodiments the command is a reset command, e.g., to reset the configuration of the device to a default configuration or the last successful configuration prior to the configuration used during the communications failure. The command may be a reconfigure command instructing the device to change, e.g., the frequency band used, a power level or some other device setting. The command and/or configuration is communicated to the communications device 602 via the secondary configuration interface and in many cases can be sent using relatively few bits. For example a command to reset to the last default setting can be sent using one or a few bytes of data. Thus it should be appreciated that in many cases restoration information can be sent in a compact manner via the relatively low data rate secondary interface where the secondary interface in many cases supports an average data rate less than ⅒th or 1/100th or even 1/1000th that of the primary interface.

Steps 952, 954 represent the forwarding of the command/ information sent in step 950 by the communications network 614 and secondary network access device 616. In step 956 the command and/or configuration information sent in step 950 is received via the secondary communications interface of the communications device 602. Following the receipt of the command in step 956, in step 958 the communications device 602 implements the command and/or configuration and then proceeds in step 960 to further communicate with the management system 624 via the primacy communications interface. Communication in step 960 may involve use of a minimal level of access achieved after implementing the command/configuration change received in step 958. In step 968 the management system supplies optional additional updates via the primary communications interface to bring the communications device 602 to full service. The additional updates may include software or operating system patches to be applied by the device 602 which can be several megabytes in size and which may be, and sometimes are, too large to send via the secondary communications interface of the device 602. Steps 964, 966 represent the communication of information and/or data including updates between the communications device 602 and 624 via primary network access device 604 and communications network 614 as part of performing an additional update of device 602 via the primary communications interface.

Once the update had been completed operation proceeds to step 970 in which the communication device proceeds with full duplex communication via the primary communication network and supports, via the primary communications network and primary interface services including voice, data and/or video services. In step 972 the primary network, including primary network access point 604 provides services to the communications device 602.

While in some embodiments the secondary interface is powered whenever the primary interface is powered, in some other embodiments during periods of time in which the primary interface is active and communication is supported via the primary interface, the secondary interface is powered off and not used. The processor in the communications device 602 is responsible for controlling whether the secondary interface is in a powered on or powered off state. Thus in some embodiments following detection of the failure condition in step 916, the communication device will power on the secondary interface which was in a powered off state at the time the failure of the primary interface was detected. This occurs in optional step 917. Once powered on the secondary interface is used in step 918 to send the request for assistance. The secondary interface is powered off after communication is restored via the primary interface in such embodiments, e.g., in optional step 961. In this way power can be conserved and interference associated with transmissions and/or operation of the secondary interface can be avoided. Such embodiments are normally embodiments where the condition of the primary interface is monitored by the communications device 602 and restoration of primary interface operation after a fault involves the communications device 602 powering on the secondary interface after detection of a failure condition with respect to the primary interface. In at least some embodiments the secondary interface is then powered down after restoration of communication via the primary communications interface, e.g., after step 960 of FIG. 9C such as in step 961.

Figure 10:
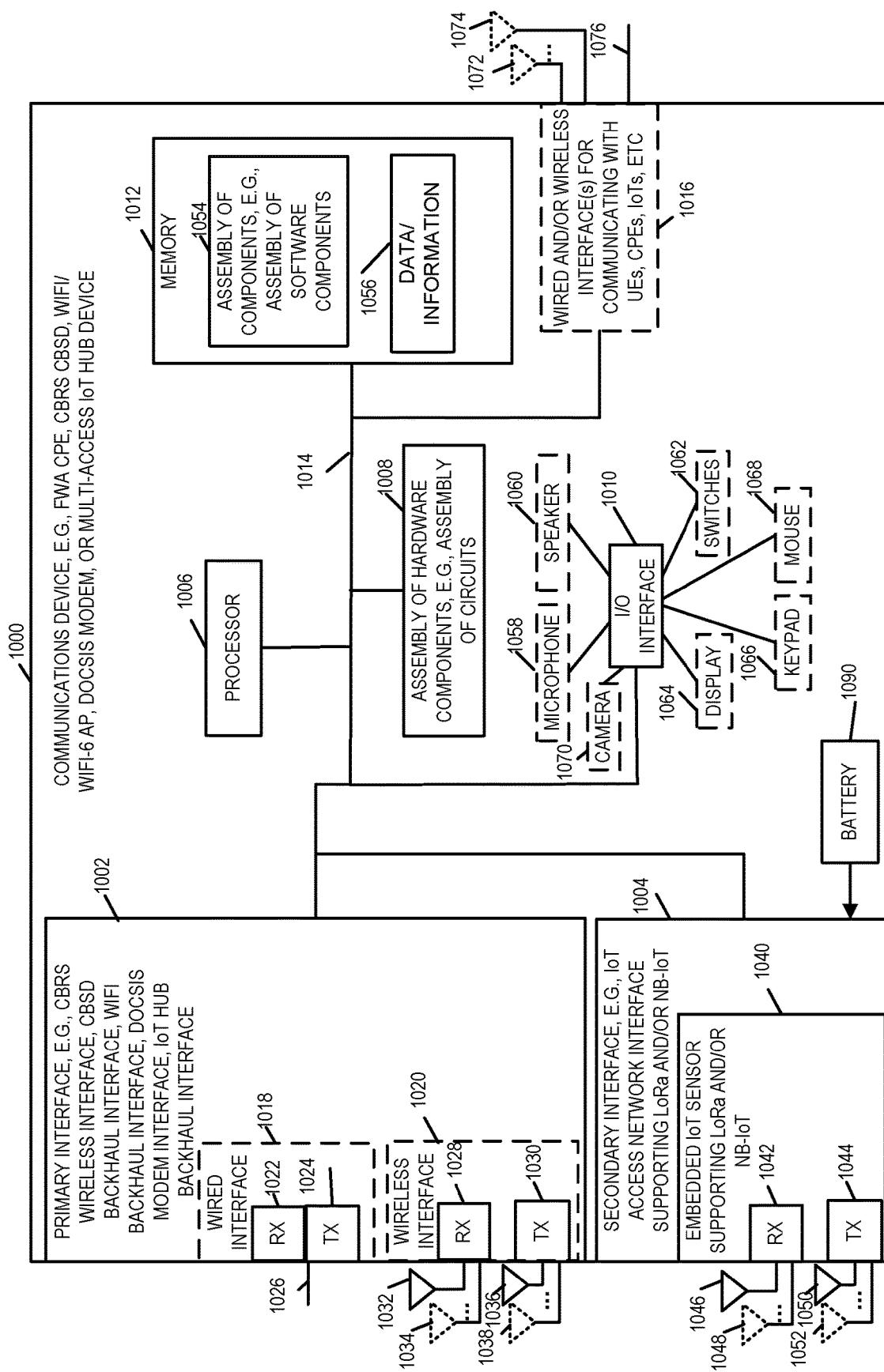
FIG. 10 is a drawing of an exemplary communications device in accordance with an exemplary embodiment.

FIG. 10 is a drawing of an exemplary communications device 1000, e.g., a FWA CPE, a CBRS CBSD, a WiFi/Wi-Fi-6 AP, a Docsis modem, or a multi-access IoT hub device, in accordance with an exemplary embodiment. Exemplary communications device 1000 is, e.g., any of communications device 102 of FIG. 1, communications device 202 of FIG. 2, communications device 302 of FIG. 4, communications device 402 of FIG. 4, communications device 502 of FIG. 5, or communications device 602 of FIGS. 6-9.

Communications device 1000 includes a primary interface 1002, a secondary interface 1004, a processor 1006, e.g., a COU, an assembly of hardware components 1008, e.g., an assembly of circuits, an I/O interface 1010, and memory 1012 coupled together via a bus 1014 over which the various elements may interchange data and information. Communications device 1000 further includes a battery 1090, e.g., used to supply power and allow communications via the secondary interface 1004 during line power outages. In some embodiments communications device 1000 further includes additional wired and/or wireless interfaces 1016 for communicating with devices, e.g., UE's, CPEs, and/or IoT devices.

In some embodiments, the communications device 1000 further includes one or more or all of: microphone 1058, speaker 1060, switches 1062, display 1064, e.g., a touch-screen display, keypad 1066, mouse 1068 and camera 1070, which are coupled to bus 1014 via I/O interface 1010.

Memory 1012 includes assembly of components 1054, e.g., an assembly of software components, and data/information 1056.

Primary interface 1002, e.g., a CBRS wireless interface included in a FWA CPE, a CBSD backhaul interface included in a CBRS CBSD, a WiFi backhaul interface, a Docsis modem interface, or a IoT hub backhaul interface, includes a wired interface 1018 and/or a wireless interface 1020, e.g., depending upon the particular embodiment. Wired interface 1018 includes a receiver 1022 and a transmitter 1024 coupled to wired cable or bus 1026 via which the communications device 1000 may receive and send signals to a primary network access device. Wireless interface 1020 includes a wireless receiver 1028 coupled to one or more receive antennas (1032, . . . 1034) via which the communications device may receive wireless signals from a primary network access device. Wireless interface 1020 further includes a wireless transmitter 1030 coupled to one or more transmit antennas (1036, . . . 1038) via which the communications device may transmit wireless signals to a primary network access device. In some embodiments one or more of the same antennas are used for both receive and transmit.

Secondary interface 1004, e.g., an IoT access network interface supporting LaRa and/or NB-IoT, includes an embedded IoT sensor 1040 supporting LaRa and/or NB-IoT. Embedded IoT sensor 1040 includes a wireless receiver 1042 coupled to one or more receive antennas (1046, . . . , 1048) via which the communications device 1000 may receive wireless signals, e.g. LoRa and/or NB-IoT wireless signals, from a secondary network access device. Embedded IoT sensor 1040 further includes a wireless transmitter 1044 coupled to one or more transmit antennas (1050, . . . , 1052) via which the communications device 1000 may transmit wireless signals, e.g. LoRa and/or NB-IoT wireless signals, to a secondary network access device. In some embodiments, one or more of the same antennas are used for both receive and transmit.

Additional wired and/or wireless interface(s) 1016, which includes one or more receivers and one or more transmitters, is coupled to one or more antennas (1072, ..., 1072) and/or to cable or bus 1076 via which the communications device 100 may receive and transmit signal to UEs, CPEs, and/or IoT devices, e.g., a UE or CPE being served by a CBSD or WiFi AP, a CPE being served by a Docsis cable modem, and IoT devices being served by a multi-access IoT hub.

Exemplary communications device 1000 may, and sometimes does, implement steps of a method described with respect to FIGS. 7, 8 and/or 9.

Figure 11:
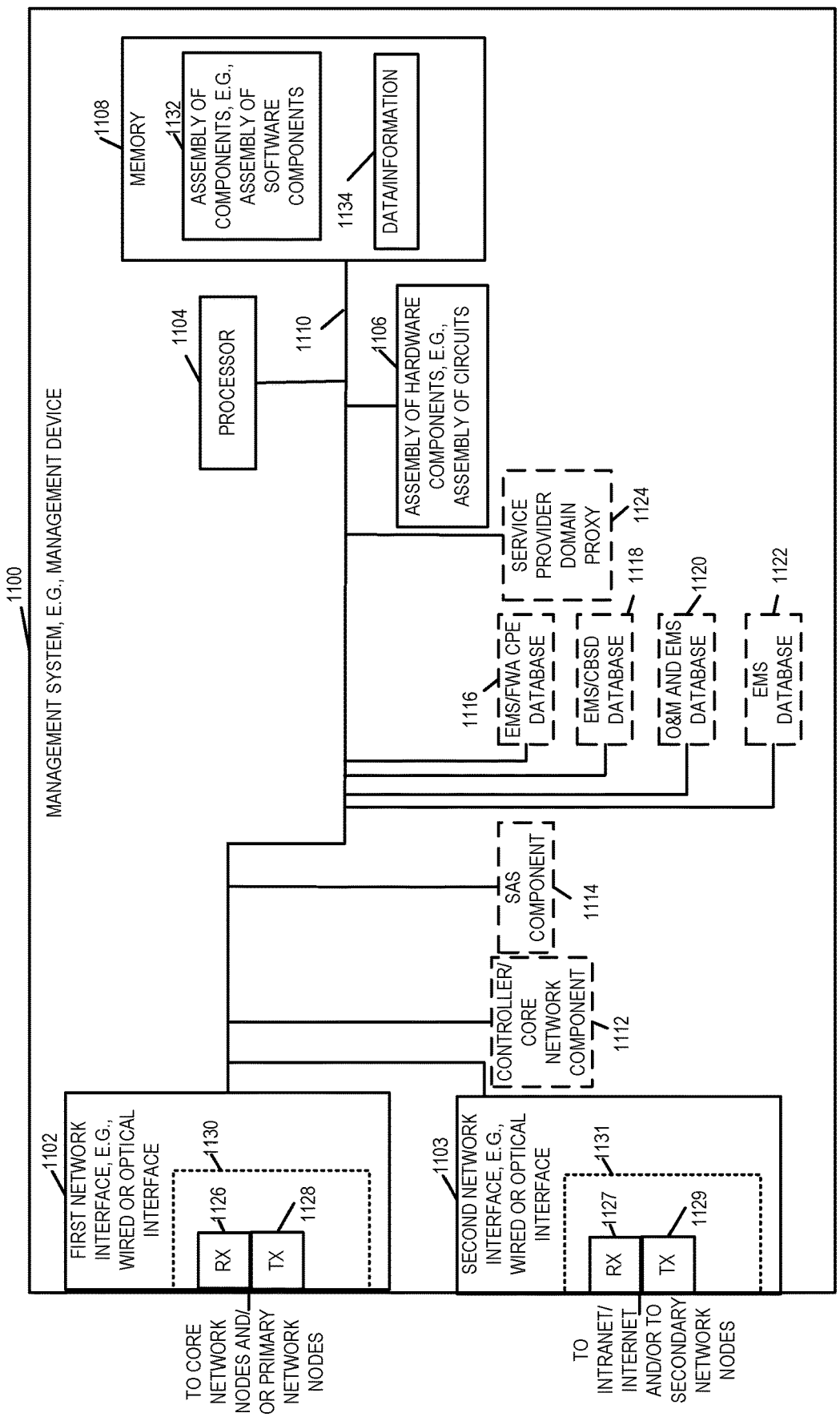
FIG. 11 is a drawing of an exemplary management system, e.g., a management device, in accordance with an exemplary embodiment.

FIG. 11 is a drawing of an exemplary management system 1100, e.g., a management device, in accordance with an exemplary embodiment. Exemplary management system 1110 is, e.g., any of management system 124 of FIG. 1, management system 224 of FIG. 2, management system 324 of FIG. 3, management system 424 of FIG. 4, management system 524 of FIG. 5, or management system 624 of FIG. 6-9. Exemplary management system 1100 may, and sometimes does, implement steps of a method described with respect to FIGS. 7, 8 and/or 9.

Management system 1100 includes a first network interface 1102, a second network interface 1103, a processor 1104, e.g., a CPU, an assembly of hardware components 1106, e.g., an assembly of circuits, and memory 1108 coupled to a bus 1110 over which the various elements may interchange data and information. In some embodiments, the management system 1100 includes one or more or all of: a controller/core network component 1112, a SAS component 1114, an EMS/FWA CPE database 1116, an EMS/CBSD database 1118, an O&M and EMS database 1120, an EMS database 1122, and a service provider domain proxy 1124 coupled to bus 1110.

First network interface 1102, e.g., a wired or optical interface, includes a receiver 1126 and a transmitter 1128. In some embodiments, the receiver 1126 and transmitter 1128 are included as part of a transceiver 1130. The management system 1100 receives signals from core network nodes and/or primary network nodes via receiver 1126. The management system 1100 transmits signals to core network nodes and/or primary network nodes via transmitter 1128.

Second network interface 1103, e.g., a wired or optical interface, includes a receiver 1127 and a transmitter 1129. In some embodiments, the receiver 1127 and transmitter 1129 are included as part of a transceiver 1131. The management system 1100 receives signals from an Intranet, the Internet, and/or secondary network nodes network nodes via receiver 1127. The management system 1100 transmits signals to an Intranet, the Internet, and/or secondary network nodes network nodes via transmitter 1129.

Memory 1108 includes an assembly of components 1132, e.g., an assembly of software components, and data/information 1134.

Figure 12A:
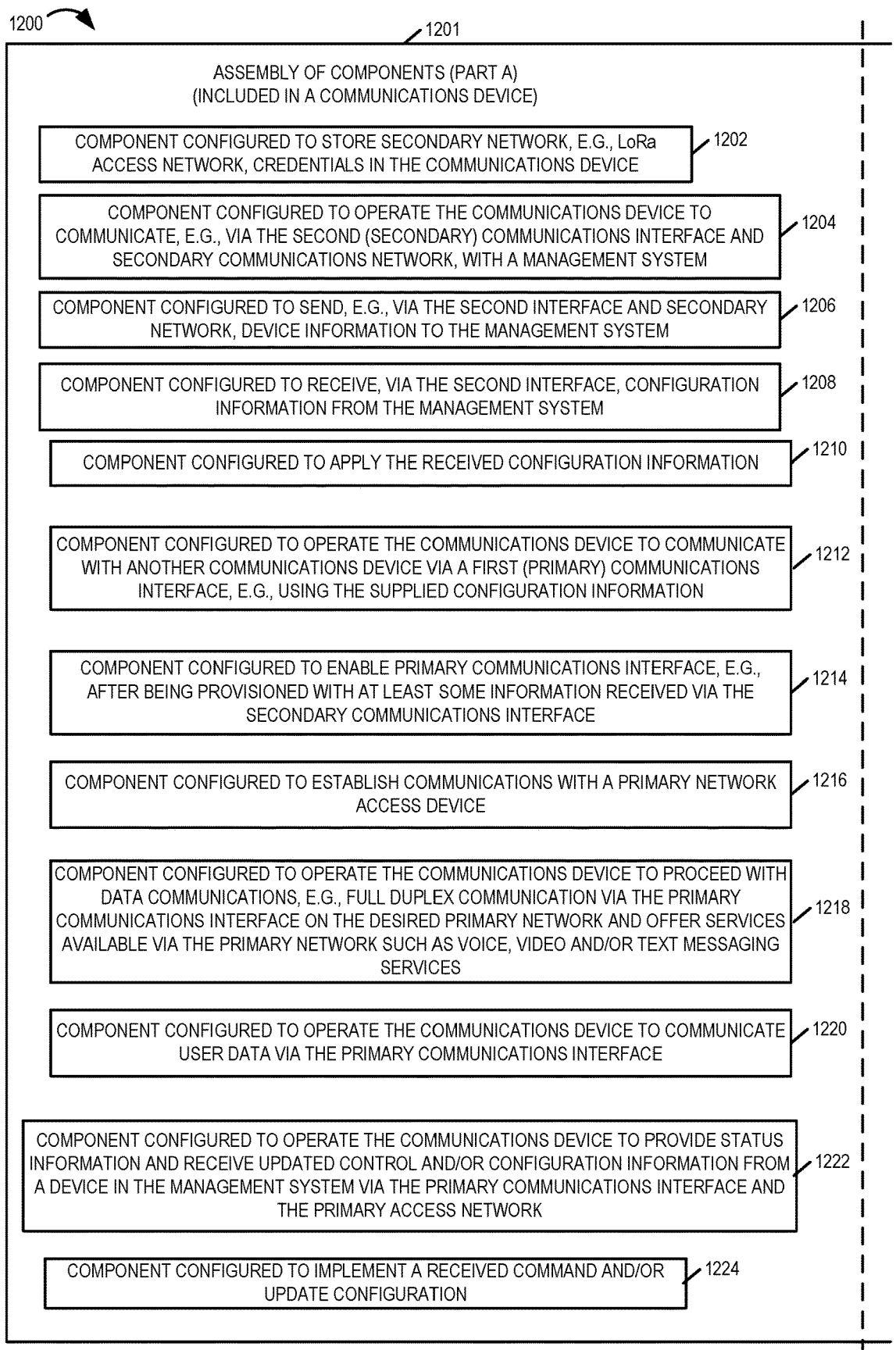
FIG. 12A is a drawing of a first part of an exemplary assembly of components which may be included in an exemplary communications device in accordance with an exemplary embodiment.
Figures 12, 12B:
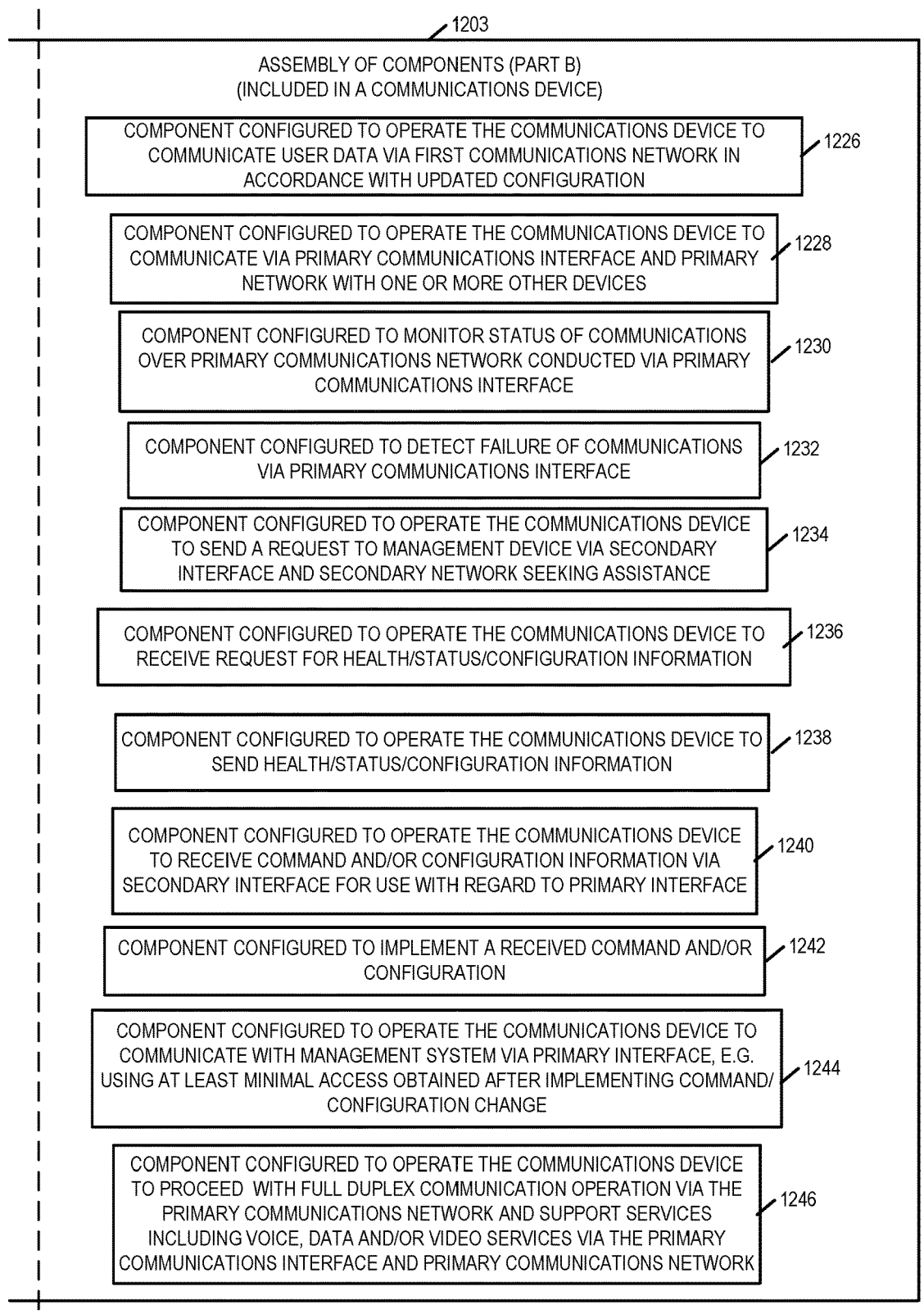
FIG. 12B is a drawing of a second part of an exemplary assembly of components which may be included in an exemplary communications device in accordance with an exemplary embodiment FIG. 12 comprises the combination of FIG. 12A and FIG. 12B.

FIG. 12, comprising the combination of FIG. 12A and FIG. 12B, is a drawing of an exemplary assembly of components 1200, comprising Part A 1201 and Part B 1203, which may be included in an exemplary communications device, e.g., communications device 1000 of FIG. 10, in accordance with an exemplary embodiment.

Assembly of components 1200 can be, and in some embodiments is, used in communications device 1000, of FIG. 10, communications device 102 of FIG. 1, communications device 202 of FIG. 2, communications device 302 of Figure 3, communications device 402 of FIG. 4, communications device 502 of FIG. 5, and/or communications device 602 of FIGS. 6-9. The components in the assembly of components 1200 can, and in some embodiments are, implemented fully in hardware within the processor 1006, e.g., as individual circuits. The components in the assembly of components 1200 can, and in some embodiments are, implemented fully in hardware within the assembly of components 1008, e.g., as individual circuits corresponding to the different components. In other embodiments some of the components are implemented, e.g., as circuits, within the processor 1006 with other components being implemented, e.g., as circuits within assembly of components 1008, external to and coupled to the processor 1006. As should be appreciated the level of integration of components on the processor and/or with some components being external to the processor may be one of design choice. Alternatively, rather than being implemented as circuits, all or some of the components may be implemented in software and stored in the memory 1012 of the communications device 1000, with the components controlling operation of the communications device to implement the functions corresponding to the components when the components are executed by a processor, e.g., processor 1006. In some such embodiments, the assembly of components 1200 is included in the memory 1012 as assembly of components 1054. In still other embodiments, various components in assembly of components 1200 are implemented as a combination of hardware and software, e.g., with another circuit external to the processor 1006 providing input to the processor 1006 which then under software control operates to perform a portion of a component's function. While processor 1006 is shown in the FIG. 10 embodiment as a single processor, e.g., computer, it should be appreciated that the processor 1006 may be implemented as one or more processors, e.g., computers.

When implemented in software the components include code, which when executed by the processor 1006, configure the processor 1006 to implement the function corresponding to the component. In embodiments where the assembly of components 1200 is stored in the memory 1012, the memory 1012 is a computer program product comprising a computer readable medium comprising code, e.g., individual code for each component, for causing at least one computer, e.g., processor 1006, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the communications device 1000, or elements therein such as the processor 1006, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of the method of signaling flow diagram 700 of FIG. 7, signaling flow diagram 800 of FIG. 8, steps of the signaling flow diagram 900 of FIG. 9 and/or described or shown with respect to any of the other figures.

Assembly of components 1200 includes a component 1202 configured to store secondary network, e.g., LoRa access network, credentials in the communications device, a component 1204 configured to operate the communications device to communicate, e.g., via the second (secondary)

communications interface and secondary communications network with a management system, a component 1206 configured to send, e.g., via the second interface and secondary network, device information to the management system, a component 1208 configured to receive, via the second interface, configuration information from the management system, a component 1210 configured to apply the received configuration information, and a component 1212 configured to operate the communication device to communicate with another communications device via a first (primary) communications interface, e.g., using the supplied configured information.

Assembly of components 1200 further includes a component 1214 configured to enable primary communications interface, e.g., after being provisioned with at least some information received via the secondary communications interface, a component 1216 configured to establish communications with a primary network access device, a component 1218 configured to operate the communications device to proceed with data communications, e.g., full duplex communications via the primary communications interface on the desired primary communications interface and offer services available via the primary network such as voice, video and/or text messaging, a component 1220 configured to operate the communications device to communicate user data via the primary communications interface, and a component 1222 configured to operate the communications device to provide status information and receive updated control and/or configuration information from a device in the management system via the primary communications system and the primary access network.

Assembly of components 1200 further includes a component 1224 configured to implement a received command and/or update configuration, a component 1226 configured to operate the communications device to communicate user data via a first communication network (primary communications network) in accordance with the updated configuration, a component 1228 configured to operate the communications device to communicate via primary communications interface and primary communications network with one or more other devices, a component 1230 configured to monitor the status of communications over the primary communications network conducted via primary communications interface, a component 1232 configured to detect failure of communications via the primary communications interface, a component 1234 configured to operate the communications device to send a request to management device via secondary interface and secondary network seeking assistance, a component 1236 configured to operate the communications device to receive a request for heath/status/configuration information, and a component 1238 configured to operate the communications device to send health/status/configuration information, e.g. to the management system in response to a received request. Assembly of components 1200 further includes a component 1240 configured to operate the communications device to receive a command and/or configuration information via the secondary interface for use with regard to the primary interface, a component 1242 configured to implement a received command and/or a configuration, e.g. based on received configuration information, a component 1244 configured to operate the communications device to communicate with the management system via primary interface, e.g. using at least minimal access obtained after implementing command/configuration change, and a component 1246 configured to operate the communications device to proceed with full duplex communication operation via the primary communication network and support services including voice, data and/or video services via the primary communications interface and primary communication network.

Figure 13:
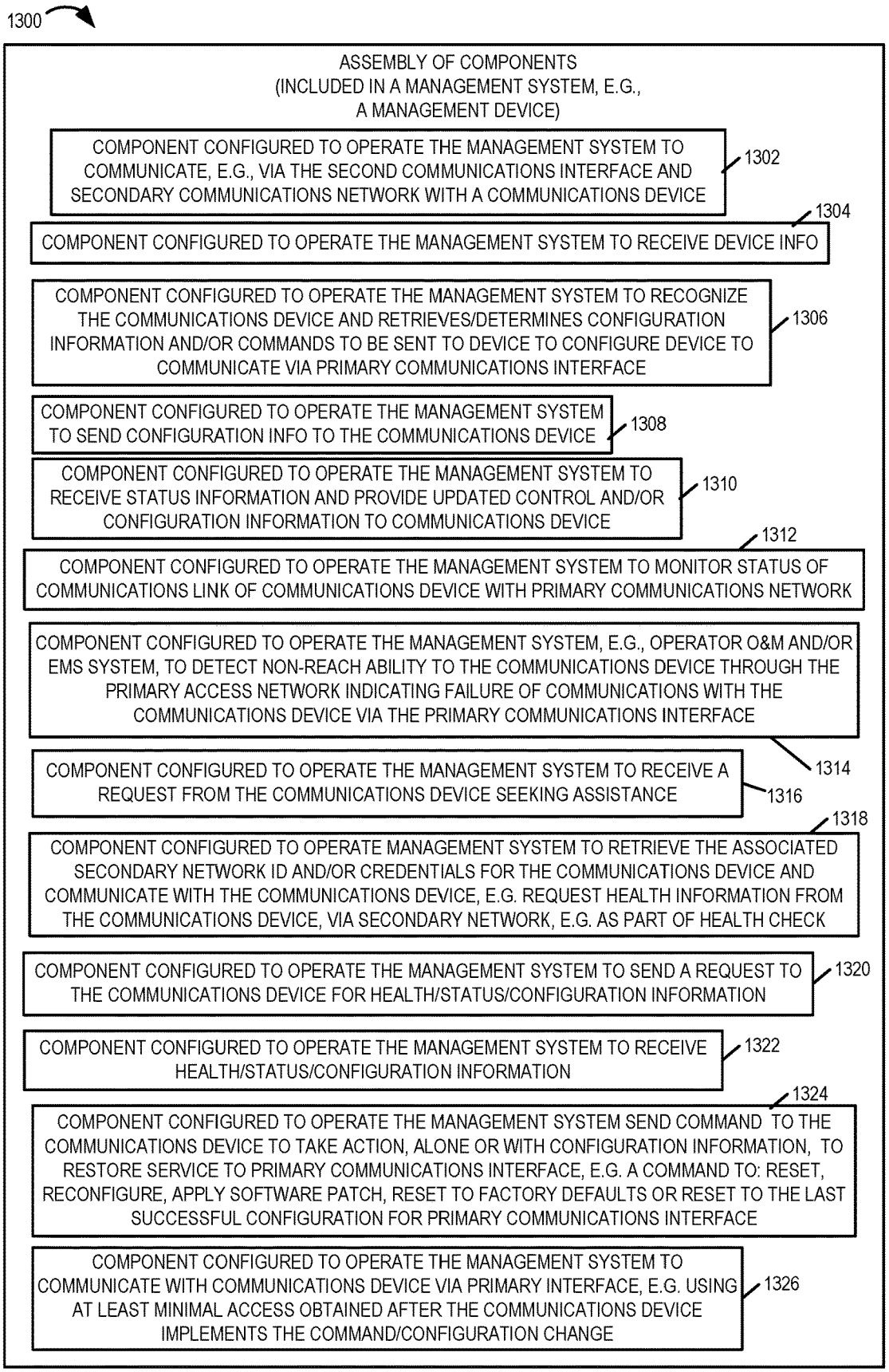
FIG. 13 is a drawing of an exemplary assembly of components which may be included in an exemplary management system in accordance with an exemplary embodiment.

FIG. 13 is a drawing of an exemplary assembly of components 1300 which may be included in an exemplary management system, e.g., management system 1100 of FIG. 11, in accordance with an exemplary embodiment.

Assembly of components 1300 can be, and in some embodiments is, used in management system 1100, of FIG. 11, management system 124 of FIG. 1, management system 224 of FIG. 2, management system 324 of FIG. 3, management system 424 of FIG. 4, management system 524 of FIG. 5, and/or management system 624 of FIGS. 6-9. The components in the assembly of components 1300 can, and in some embodiments are, implemented fully in hardware within the processor 11104, e.g., as individual circuits. The components in the assembly of components 1300 can, and in some embodiments are, implemented fully in hardware within the assembly of components 1106, e.g., as individual circuits corresponding to the different components. In other embodiments some of the components are implemented, e.g., as circuits, within the processor 1104 with other components being implemented, e.g., as circuits within assembly of components 1106, external to and coupled to the processor 1104. As should be appreciated the level of integration of components on the processor and/or with some components being external to the processor may be one of design choice. Alternatively, rather than being implemented as circuits, all or some of the components may be implemented in software and stored in the memory 1108 of the management system 1100, with the components controlling operation of the management system 1100 to implement the functions corresponding to the components when the components are executed by a processor, e.g., processor 1104. In some such embodiments, the assembly of components 1300 is included in the memory 1108 as assembly of components 1132. In still other embodiments, various components in assembly of components 1300 are implemented as a combination of hardware and software, e.g., with another circuit external to the processor 1104 providing input to the processor 1104 which then under software control operates to perform a portion of a component's function. While processor 1104 is shown in the FIG. 11 embodiment as a single processor, e.g., computer, it should be appreciated that the processor 1104 may be implemented as one or more processors, e.g., computers.

When implemented in software the components include code, which when executed by the processor 1104, configure the processor 1104 to implement the function corresponding to the component. In embodiments where the assembly of components 1300 is stored in the memory 1108, the memory 1108 is a computer program product comprising a computer readable medium comprising code, e.g., individual code for each component, for causing at least one computer, e.g., processor 1104, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the management system 1100, or elements therein such as the processor 1104, to perform the functions of corresponding steps illustrated and/or described in the method of one or more of the flowcharts, signaling diagrams and/or described with respect to any of the Figures. Thus the assembly of components 1300 includes various components that perform functions of corresponding one or more described and/or illustrated steps of an exemplary method, e.g., steps of the method of signaling flow diagram 700 of FIG. 7, signaling flow diagram 800 of FIG. 8, steps of the signaling flow diagram 900 of FIG. 9 and/or described or shown with respect to any of the other figures. In some embodiments some of the components in assembly of components 1300 are implemented by one or more of: controller/core network component 1112, a SAS component 1114, an EMS/FWA CPE database 1116, an EMS/CBSD database 1118, an O&M and EMS database 1120, an EMS database 1122, and a service provider domain proxy 1124.

Assembly of components 1300 includes a component 1302 configured to operate the management system to communicate, e.g., via the second communications interface and second communications network, with a communications device, a component 1304 configured to operate the management system to receive device information from the communication device, e.g., communicated via the second communications network, a component 1306 configured to operate the management system to recognize the communications device and retrieve/determine configuration information and/or commands to be sent to the communications device to configured the communications device to allow the communications device to be able to communicate via the primary communications interface, a component 1306 configured to operate the management system to send the retrieved and/or determined configuration information to the communications device, a component 1310 configured to operate the management system to receive status information and to provide update d control and/or configuration information to the communications device, a component 1312 configured to operate the management system to monitor status of the communication link of the communication device with the primary communications network, a component 1314 configured to operate the management system, e.g., operator O&M and/or EMS system, to detect non-reachability to the communications device through the primary access network indicating failure of communications with the communications device via the primary communications interface, and a component 1316 configured to operate the management system to receive a request from the communications device seeking assistance.

Assembly of components 1300 includes a component 1318 configured to operate the management system to retrieve the associated secondary network ID and/or credentials for the communications device and communicate, e.g. request health information from, the communications device via the secondary network, e.g., as part of a health check, a component 1320 configured to operate the management system to send a request to the communications device for health/status/configuration information, a component 1322 configured to operate the management system to receive health/status configuration information, a component 1324 configured to operate the management system to send a command to the communications device to take action, alone or with confirmation information, to restore service to the primary communications interface, e.g., a command to: reset, reconfigure, apply a software patch, reset to factory defaults, or reset the last successful configuration for the primary communications interface, and a component 1326 configured to operate the management system to communicate with the communications device via the primary interface, e.g. using at least minimal access obtained after the communications device implements the command/configuration change.

Numbered List of Exemplary Method Embodiments:

Method Embodiment 1

A method of operating a communications device including a first (primary) communications interface and a second (secondary) communications interface, the method comprising: storing (701) (e.g., prior to deployment at a customer premises location), in the communications device, secondary communications network credentials, the secondary communications network credentials being for use via the second communications interface, said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum; communicating (702) via the second interface and a secondary communications network (e.g., a low-power wide-area network (LPWAN) such as a LoRa communications network or a NB-IoT network) with a management system; receiving (720) from the management system configuration information for configuring the communications device to communicate over the first (primary) communications interface; and operating (724) the communications device to communicate, in accordance with the received configuration information, via the first communications interface.

Method Embodiment 2

The method of Method Embodiment 1, wherein operating (724) the communications device to communicate via the first communications interface includes communicating traffic data via the first communications interface, said traffic data including at least one of: i) user data (e.g., voice or video corresponding to a voice or video call), ii) sensor data or iii) application data (e.g., text messages, WORD documents, etc); and wherein said second communications interface is not used to communicate user data or application data.

Method Embodiment 3

The method of Method Embodiment 2, wherein said second communications interface supports a lower maximum average transmission data rate than said first communications interface.

Method Embodiment 4

The method of Method Embodiment 3, wherein said second communications interface is a long range interface, a second transmission range of wireless signals sent via the second communications interface being greater than a first maximum transmission range of wireless signals sent via the first communications interface.

Method Embodiment 5

The method of Method Embodiment 1, wherein said configuration information includes provisioning information used to configure the first communications interface, said configuration information includes at least one of: (but could be one, more or all of): i) transmission power level information indicating a maximum transmit power level to be used for wireless transmissions made using the first communications interface, ii) first security information (e.g., a first encryption key) to be used for securing communications (e.g., encrypting/decrypting) sent via the first communications interface; iii) a first identifier to be used by the communications device, said first identifier identifying the communications device via transmissions made via the first communications interface (e.g., an SSD or device ID transmitted via the first communications interface).

Method Embodiment 6

The method of Method Embodiment 5, wherein said secondary communications network credentials includes at least one (but possibly all) of: i) a second identifier assigned to said communications device prior to deployment of said communications device; and ii) an encryption key or shared secret to be used for securing communications via said second communications interface.

Method Embodiment 7

The method of Method Embodiment 6, wherein said first and second identifiers are different.

Method Embodiment 8

The method of Method Embodiment 6, wherein said first communications interface is one of a wired or wireless communications interface; and wherein said second communications interface is a wireless interface.

Method Embodiment 9

The method of Method Embodiment 1, further comprising: communicating (918) at least one of i) status or ii) configuration information to the management system following a failure (complete or partial communications failure) via the first (primary) communications interface; receiving (956) at least one of i) updated configuration information or ii) a control command from the management system; and implementing (970) communication via the first (primary) communications interface (e.g., begin full duplex communication via the primary interface again) after implementing the control command (e.g., restore previous configuration or restore factory default setting) or using the updated configuration information (e.g., new security information, frequency band, etc.) received via the second (secondary) communications interface.

Method Embodiment 10

The method of Method Embodiment 9, wherein communications via the second (secondary) communications interface is implemented via backup power following a loss of wire supplied power resulting in a communication failure via the first (primary) communications interface or a loss of configuration information due to a wire supplied power failure.

Method Embodiment 11

The method of Method Embodiment 10, further comprising: operating (916) the communications device to detect a communications failure with regard to communications via the first communications interface; and wherein said step of communicating (918) at least one of: i) status or ii) configuration information to the management system following a failure (complete or partial communications failure) via the first (primary) communications interface is performed by said communications device in response to detecting (916) the communications failure.

Method Embodiment 12

The method of Method Embodiment 1, further comprising: receiving (932) via the second (secondary) communications interface (from the management system) a request for device status or configuration information, said request being received after detection, by said management system, of a communications failure with regard to the first communications interface that prevents communication with the communications device via the first communications interface.

Method Embodiment 13

The method of Method Embodiment 12, further comprising: responding (934) to said request for device status or configuration information by communicating at least one of: i) status or ii) configuration information to the management system following the failure.

Method Embodiment 14

The method of Method Embodiment 5, wherein said communications device is a fixed wireless access (FWA) customer premises equipment (CPE) device with an embedded IoT sensor.

Method Embodiment 15

The method of Method Embodiment 5, wherein the communications device is a Citizens Broadband Radio Service (CBRS) Citizens Broadband radio Service Device (CBSD) and wherein the received information for configuring the communications device to communicate over the first communications interface (primary network interface) includes a CBSD identifier (CBSD-ID) to be used for communication over the first communications interface.

Method Embodiment 16

The method of Method Embodiment 5, wherein the communications device is a Citizens Broadband Radio Service (CBRS) Citizens Broadband radio Service Device (CBSD) and wherein said first communications interface is a wired interface.

Method Embodiment 17

The method of Method Embodiment 5, wherein the communications device is a WiFi access point and wherein said first communications interface is a WiFi interface.

Method Embodiment 18

The method of Method Embodiment 5, wherein the communications device is a Docsis modem, wherein said first communications interface is a cable interface and wherein said second interface is an LoRa interface included in said Docsis modem.

Method Embodiment 19

The method of Method Embodiment 5, wherein the communications device is a multi-access IoT hub in one of a home, enterprise, hotel or hospital.

Numbered List of Exemplary Apparatus Embodiments:

Apparatus Embodiment 1

A communications device (102 or 202 or 302 or 402 or 502 or 602 or 1000) comprising: a first (primary) communications interface (126 or 226 or 326 or 426 or 526 or 626 or 1002); a second (secondary) communications interface (128 or 228 or 328 or 428 or 528 or 628 or 1004), said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum; and a memory (1012) including (e.g., prior to deployment at a customer premises location), secondary communications network credentials, the secondary communications network credentials including an identifier used for communicating via the secondary communications interface; and a processor (1006) configured to control the communications device to: communicate (702) via the second interface and a secondary communications network (e.g., a low-power wide-area network (LPWAN) such as a LoRa communications network or a NB-IoT network) with a management system; receive (720) from the management system configuration information for configuring the communications device to communicate over the first (primary) communications interface; and communicate (724), in accordance with the received configuration information, via the first communications interface.

Apparatus Embodiment 2

The communications device (102 or 202 or 302 or 402 or 502 or 602 or 1000) of Apparatus Embodiment 1, wherein the processor (1006) is configured, as part of controlling the communications device to communicate via the first communications interface, controls the communications device to communicate traffic data via the first communications interface, said traffic data including at least one of: i) user data (e.g., voice or video corresponding to a voice or video call), ii) sensor data or iii) application data (e.g., text messages, WORD documents, etc); and wherein said second communications interface is not used to communicate user data or application data.

Apparatus Embodiment 3

The communications device (102 or 202 or 302 or 402 or 502 or 602 or 1000) of Apparatus Embodiment 2, wherein said second communications interface (128 or 228 or 328 or 428 or 528 or 628 or 1004) supports a lower maximum average transmission data rate than said first communications interface (126 or 226 or 326 or 426 or 526 or 626 or 1002).

Apparatus Embodiment 4

The communications device (102 or 202 or 302 or 402 or 502 or 602 or 1000) of Apparatus Embodiment 3, wherein said second communications interface (128 or 228 or 328 or 428 or 528 or 628 or 1004) is a long range interface, a second transmission range of wireless signals sent via the second communications interface being greater than a first maximum transmission range of wireless signals sent via the first communications interface (126 or 226 or 326 or 426 or 526 or 626 or 1002).

Apparatus Embodiment 5

The communications device (102 or 202 or 302 or 402 or 502 or 602 or 1000) of Apparatus Embodiment 1, wherein said configuration information includes provisioning information used to configure the first communications interface, said configuration information includes at least one of: (but could be one, more or all of): i) transmission power level information indicating a maximum transmit power level to be used for wireless transmissions made using the first communications interface, ii) first security information (e.g., a first encryption key) to be used for securing communications (e.g., encrypting/decrypting) sent via the first communications interface; iii) a first identifier to be used by the communications device, said first identifier identifying the communications device via transmissions made via the first communications interface (e.g., an SSID or device ID transmitted via the first communications interface).

Apparatus Embodiment 6

The communications device (102 or 202 or 302 or 402 or 502 or 602 or 1000) of Apparatus Embodiment 5, wherein said secondary communications network credentials stored in said memory include at least one (but possibly all) of: i) a second identifier assigned to said communications device prior to deployment of said communications device; and ii) an encryption key or shared secret to be used for securing communications via said second communications interface.

Apparatus Embodiment 7

The communications device (102 or 202 or 302 or 402 or 502 or 602 or 1000) of Apparatus Embodiment 6, wherein said first and second identifiers are different.

Apparatus Embodiment 8

The communications device (102 or 202 or 302 or 402 or 502 or 602 or 1000) of Apparatus Embodiment 6, wherein said first communications interface (126 or 226 or 326 or 426 or 526 or 626 or 1002) is one of a wired or wireless communications interface; and wherein said second communications interface is a wireless interface (128 or 228 or 328 or 428 or 528 or 628 or 1004).

Apparatus Embodiment 9

The communications device (102 or 202 or 302 or 402 or 502 or 602 or 1000) of Apparatus Embodiment 1, wherein said processor (1006) is further configured to control the communications device to: communicate at least one of i) status or ii) configuration information to the management system following a failure (complete or partial communications failure) via the first (primary) communications interface; receive at least one of i) updated configuration information or ii) a control command from the management system; and implement communication via the first (primary) communications interface (e.g., begin full duplex communication via the primary interface again) after implementing the control command (e.g., restore previous configuration or restore factory default setting) or using the updated configuration information (e.g., new security information, frequency band, etc.) received via the second (secondary)communications interface.

Apparatus Embodiment 10

The communications device (102 or 202 or 302 or 402 or 502 or 602 or 1000) of Apparatus Embodiment 9, further comprising: a battery (1090) for supplying backup power; and wherein communications via the second (secondary) communications interface is implemented via backup power from the battery following a loss of wire supplied power resulting in a communication failure via the first (primary) communications interface or a loss of configuration information due to a wire supplied power failure.

Apparatus Embodiment 11

The communications device (102 or 202 or 302 or 402 or 502 or 602 or 1000) of Apparatus Embodiment 10, wherein the processor (1006) is further configured to control the communications device to: detect a communications failure via the first communications interface; and communicate at least one of: i) status or ii) configuration information to the management system following a failure (complete or partial communications failure) via the first (primary) communications interface is performed by said communications device in response to detecting the communications failure via the first communications interface.

Apparatus Embodiment 12

The communications device (102 or 202 or 302 or 402 or 502 or 602 or 1000) of Apparatus Embodiment 1, wherein the processor (1006) is further configured to control the communications device to: receive (932) via the second (secondary) communications interface (from the management system) a request for device status or configuration information, said request being received after detection, by said management system, of a communications failure with regard to the first communications interface that prevents communication with the communications device via the first communications interface.

Apparatus Embodiment 13

The communications device (102 or 202 or 302 or 402 or 502 or 602 or 1000) of Apparatus Embodiment 12, wherein the processor (1006) is further configured to control the communications device to: respond (934) to said request for device status or configuration information by communicating at least one of: i) status or ii) configuration information to the management system following the failure.

Apparatus Embodiment 14

The communications device (102 or 602 or 1000) of Apparatus Embodiment 5, wherein said communications device is a fixed wireless access (FWA) customer premises equipment (CPE) device with an embedded IoT sensor.

Apparatus Embodiment 15

The communications device (202 or 602 or 1000) of Apparatus Embodiment 5, wherein the communications device is a Citizens Broadband Radio Service (CBRS) Citizens Broadband radio Service Device (CBSD) and wherein the received information for configuring the communications device to communicate over the first communications interface (primary network interface) includes a CBSD identifier (CBSD-ID) to be used for communication over the first communications interface.

Apparatus Embodiment 16

The communications device (202 or 602 or 1000) of Apparatus Embodiment 5, wherein the communications device is a Citizens Broadband Radio Service (CBRS) Citizens Broadband radio Service Device (CBSD) and wherein said first communications interface is a wired interface.

Apparatus Embodiment 17

The communications device (302 or 602 or 1000) of Apparatus Embodiment 5, wherein the communications device is a WiFi access point and wherein said first communications interface is a WiFi interface.

Apparatus Embodiment 18 The communications device (402 or 602 or 1000) of Apparatus Embodiment 5, wherein the communications device is a Docsis modem, wherein said first communications interface is a cable interface and wherein said second interface is an LoRa interface included in said Docsis modem.

Apparatus Embodiment 19

The communications device (502 or 602 or 1000) of Apparatus Embodiment 5, wherein the communications device is a multi-access IoT hub in one of a home, enterprise, hotel or hospital.

Numbered List of Exemplary Non-Transitory Computer Readable Medium Embodiments:

Non-Transitory Computer readable Medium Embodiment 1.

A non-transitory computer readable medium (1012) including computer executable instructions which when executed by a processor (1006) control a communications device (1000) including a first communications interface (1002) and a second communications interface (1004) to perform the steps of: storing, in the communications device, secondary communications network credentials, the secondary communications network credentials being for use via the second communications interface, said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum; communicating via the second interface and a secondary communications network with a management system; receiving from the management system configuration information for configuring the communications device to communicate over the first communications interface; and operating the communications device to communicate, in accordance with the received configuration information, via the first communications interface.

While the invention and methods is explained in some cases with regard to CBRS devices, the methods and apparatus are not climited to CBRS sevcie and can be used in a wide variety of devices and applications. For example the methods and multi-interface approach can be used in cable modems and other primary technology devices as well as CBRS devices.

The techniques of various embodiments may be implemented using software, hardware and/or a combination of software and hardware. Various embodiments are directed to apparatus, e.g., communications devices such as FWA CPEs, CBRS CBSDs, WiFi/WiFi-6 APs, Docsis modems, multi-access IoT Hub devices, CBSD APs, core nodes, communication nodes, CMTS devies, network nodes, IoT network APs, LoRa APs, NB-IoT APs, management system devices, EMS devices, O&M devices, SAS devices, databases, service provider domain proxies, controllers, user devices such as a user equipment (UE) device, IoT devices, base stations such as a gNB or ng-eNB, network nodes, an AMF device, servers, customer premises equipment devices, management systems, primary networks, secondary networks, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating a communications device, e.g., a FWA CPE, a CBRS CBSD, a WiFi/WiFi-6 AP, a Docsis modem, or a multi-access IoT Hub device, a management system, a management device user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, monitoring, configuring, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a communications device, including a processor configured to implement one, multiple or all of the steps of one or more methods of the invention.

In some embodiments, the processor or processors, e.g., CPUs, of one or more devices, e.g., communications nodes such as, e.g., a FWA CPE, a CBRS CBSD, a WiFi/WiFi-6 AP, a Docsis modem, or a multi-access IoT Hub device, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a FWA CPE, a CBRS CBSD, a WiFi/WiFi-6 AP, a Docsis modem, or a multi-access IoT Hub device, including a processor which includes a component corresponding to each of the steps of the various described methods performed by the device in which the processor is included. In some but not all embodiments a device, e.g., communications node such as a FWA CPE, a CBRS CBSD, a WiFi/WiFi-6 AP, a Docsis modem, or a multi-access IoT Hub device, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as FWA CPE, a CBRS CBSD, a WiFi/WiFi-6 AP, a Docsis modem, a multi-access IoT Hub device, a controller, a management device, or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications device including a first communications interface and a second communications interface, the method comprising:
storing, in the communications device, secondary communications network credentials, the secondary communications network credentials being for use via the second communications interface, said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum;
communicating via the second communications interface and a secondary communications network with a management system;
receiving from the management system configuration information for configuring the communications device to communicate over the first communications interface, wherein said configuration information includes provisioning information used to configure the first communications interface, said configuration information includes at least one of: i) transmission power level information indicating a maximum transmit power level to be used for wireless transmissions made using the first communications interface, ii) first security information to be used for securing communications sent via the first communications interface, or iii) a first identifier to be used by the communications device, said first identifier identifying the communications device via transmissions made via the first communications interface; and
operating the communications device to communicate, in accordance with the received configuration information, via the first communications interface.

2. The method of claim 1, wherein operating the communications device to communicate via the first communications interface includes communicating traffic data via the first communications interface, said traffic data including at least one of: i) user data, ii) sensor data or iii) application data; and
wherein said second communications interface is not used to communicate user data or application data.

3. The method of claim 1, wherein said secondary communications network credentials include at least one of: i) a second identifier assigned to said communications device prior to deployment of said communications device; and ii) an encryption key or shared secret to be used for securing communications via said second communications interface.

4. The method of claim 3,
wherein said first communications interface is one of a wired or wireless communications interface; and
wherein said second communications interface is a wireless interface.

5. A method of operating a communications device including a first communications interface and a second communications interface, the method comprising:
storing, in the communications device, secondary communications network credentials, the secondary communications network credentials being for use via the second communications interface, said second communication interface being a wireless communications interface which is one of: i) a Long Range (LoRa)

wireless interface which uses sub-GHz unlicensed spectrum or ii) a Narrow Band-Internet of Things (NB-IoT) wireless interface which uses licensed spectrum;

communicating via the second communications interface and a secondary communications network with a management system;

receiving from the management system configuration information for configuring the communications device to communicate over the first communications interface;

communicating at least one of: i) status or ii) configuration information to the management system following a failure via the first communications interface;

receiving at least one of: i) updated configuration information or ii) a control command from the management system; and implementing communication via the first communications interface after implementing the control command or using the updated configuration information received via the second communications interface.

6. The method of claim 5, wherein communications via the second communications interface is implemented via backup power following a loss of wire supplied power resulting in a communication failure via the first communications interface or a loss of configuration information due to a wire supplied power failure.

7. The method of claim 5, further comprising:
operating the communications device to detect a communications failure with regard to communications via the first communications interface; and
wherein said step of communicating at least one of: i) status or ii) configuration information to the management system following a failure via the first communications interface is performed by said communications device in response to detecting the communications failure.

8. The method of claim 1, further comprising:
receiving, via the second communications interface, a request for device status or configuration information, said request being received after detection, by said management system, of a communications failure with regard to the first communications interface that prevents communication with the communications device via the first communications interface.

9. The method of claim 8, further comprising:
responding to said request for device status or configuration information by communicating at least one of: i) status or ii) configuration information to the management system following the failure.

10. The method of claim 1, wherein said communications device is a fixed wireless access (FWA) customer premises equipment (CPE) device with an embedded IoT sensor.

11. The method of claim 1, wherein the communications device is a Citizens Broadband Radio Service (CBRS) Citizens Broadband radio Service Device (CBSD) and wherein the received information for configuring the communications device to communicate over the first communications interface includes a CBSD identifier (CBSD-ID) to be used for communication over the first communications interface.

12. The method of claim 1, wherein the communications device is a WiFi access point and wherein said first communications interface is a WiFi interface.

13. The method of claim 1, wherein the communications device is a Docsis modem, wherein said first communications interface is a cable interface and wherein said second interface is a LoRa interface included in said Docsis modem.

14. The method of claim 1, wherein the communications device is a multi-access IoT hub in one of a home, enterprise, hotel or hospital.

15. A communications device comprising:
a first communications interface;
a second communications interface, said second communication interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum; and
a memory including, secondary communications network credentials, the secondary communications network credentials including an identifier used for communicating via the second communications interface; and
a processor configured to control the communications device to:
communicate via the second communications interface and a secondary communications network with a management system;
receive from the management system configuration information for configuring the communications device to communicate over the first communications interface, wherein said configuration information includes provisioning information used to configure the first communications interface, said configuration information includes at least one of: i) transmission power level information indicating a maximum transmit power level to be used for wireless transmissions made using the first communications interface, ii) first security information to be used for securing communications sent via the first communications interface, or iii) a first identifier to be used by the communications device, said first identifier identifying the communications device via transmissions made via the first communications interface; and
communicate, in accordance with the received configuration information, via the first communications interface.

16. The communications device of claim 15, wherein the processor is configured, as part of controlling the communications device to communicate via the first communications interface, to control the communications device to communicate traffic data via the first communications interface, said traffic data including at least one of: i) user data, ii) sensor data or iii) application data; and
wherein said second communications interface is not used to communicate user data or application data.

17. The communications device of claim 15, wherein said secondary communications network credentials stored in said memory include at least one of: i) a second identifier assigned to said communications device prior to deployment of said communications device, and ii) an encryption key or shared secret to be used for securing communications via said second communications interface.

18. A non-transitory computer readable medium including computer executable instructions which when executed by a processor control a communications device including a first communications interface and a second communications interface to perform the steps of:
storing, in the communications device, secondary communications network credentials, the secondary communications network credentials being for use via the second communications interface, said second communications interface being a wireless communications interface which is one of: i) a Long Range (LoRa) wireless interface which uses sub-GHz unlicensed spectrum or ii) a Narrow Band-Internet of Things (NB-IoT) wireless interface which uses licensed spectrum;

communicating via the second communications interface and a secondary communications network with a management system;

receiving from the management system configuration information for configuring the communications device to communicate over the first communications interface, wherein said configuration information includes provisioning information used to configure the first communications interface, said configuration information includes at least one of: i) transmission power level information indicating a maximum transmit power level to be used for wireless transmissions made using the first communications interface, ii) first security information to be used for securing communications sent via the first communications interface, or iii) a first identifier to be used by the communications device, said first identifier identifying the communications device via transmissions made via the first communications interface; and operating the communications device to communicate, in accordance with the received configuration information, via the first communications interface.

* * * * *